US006936395B2

(12) United States Patent
Goto et al.

(10) Patent No.: US 6,936,395 B2
(45) Date of Patent: Aug. 30, 2005

(54) IMAGE RECEIVING SHEET FOR FIXING BELT TYPE ELECTROPHOTOGRAPHY AND IMAGE FORMING METHOD USING THE SAME

(75) Inventors: Yasutomo Goto, Fujinomiya (JP); Yoshio Tani, Fujinomiya (JP); Yoshisada Nakamura, Fujinomiya (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 88 days.

(21) Appl. No.: 10/367,944

(22) Filed: Feb. 19, 2003

(65) Prior Publication Data

US 2004/0043240 A1 Mar. 4, 2004

(30) Foreign Application Priority Data

| | | |
|---|---|---|
| Feb. 15, 2002 | (JP) | 2002-038157 |
| Aug. 23, 2002 | (JP) | 2002-242875 |
| Dec. 18, 2002 | (JP) | 2002-367099 |

(51) Int. Cl.$^7$ .......................... G03G 13/16; B32B 7/02

(52) U.S. Cl. .................... 430/126; 428/212; 428/537.5

(58) Field of Search ................................ 430/126, 124; 428/212, 537.5, 195.1, 908

(56) References Cited

U.S. PATENT DOCUMENTS

| | | | | |
|---|---|---|---|---|
| 6,312,789 B1 | * | 11/2001 | Hayashi et al. | 428/195.1 |
| 6,720,064 B2 | * | 4/2004 | Goto | 428/212 |

* cited by examiner

*Primary Examiner*—John L Goodrow

(74) *Attorney, Agent, or Firm*—Young & Thompson

(57) ABSTRACT

An electrophotographic image receiving sheet with a toner image receiving layer containing a release agent and formed on a support sheet for use in a fixing belt type electrophotography is disclosed. The toner image receiving layer satisfies the following condition:

$$\gamma sp^0 - \gamma sp^1 \geqq 2.5 [mJ/m^2]$$

where $\gamma sp^0$ and $\gamma sp^1$ are values of a polar component of surface free energy of the image receiving layer before heating the image receiving sheet and after having heated the image receiving sheet to 120° C. and then cooled it to 25° C., respectively.

32 Claims, 2 Drawing Sheets

IMAGE RECEIVING SHEET FOR FIXING BELT TYPE ELECTROPHOTOGRAPHY AND IMAGE FORMING METHOD USING THE SAME

BACGROUND OF THE INVENTION

1. Field of the Invention

The present invention relates to an image receiving sheet suitable for electrophotography of a type using a fixing belt and a method of forming an image using the image receiving sheet.

2. Description of Related Art

An electrophotographic process is one of printing processes that are used as a dry process output device for copying machines and computers that has a higher printing speed. This electrophotographic process has a process of transferring a toner image to an image receiving material and fixing the toner image by passing the image receiving sheet through fixing means such as a heating and/or pressurizing head comprising fixing rollers or fixing belts so as to fix the toner image onto the image receiving sheet. There are various printing papers available as an electrophotographic printing paper such as general purpose papers including regular papers and quality papers and electrophotographic image receiving sheets that are used with the intention to provide a glossy image and a photographic feeling. As described in, for example, Japanese Unexamined Patent Publication Nos. 4-212168 and 8-211645, such an electrophotographic image receiving sheet comprises a sheet with a toner image receiving layer containing a thermoplastic resin coated thereon. The image receiving sheet is, however, apt to cause offset when it is separated from the fixing head, which often leads to transportation errors. Therefore, as described in, for example, Japanese Unexamined Patent Publication Nos. 11-52604, 11-52605, 11-52606 and 11-212292, it has been proposed to add a release agent having a certain level of release effect such as silicone compounds, fluorine compounds or wax in the toner image receiving layer or an outer layer.

An amount of release agent is desirable to be as small as possible. This is because the smaller the amount of release agent in the toner image receiving layer is, the more strongly the photographic feeling that is accentuated in an image receiving sheet with a toner image receiving layer coated thereon is enhanced. However, the amount of release agent has been optimized with respect to the electrophotographic process of the type using fixing rollers and is not always adaptable to the electrophotographic process of the type using a fixing belt. That is, in the conventional electrophotographic process of the type using a fixing rollers, the image receiving sheet is heated by the fixing rollers for a comparatively short time and immediately separated from the fixing rollers. Therefore, only part of the release agent present on the surface of the toner image receiving layer is instrumental in separation of the image receiving sheet from the fixing rollers and the remaining part of the release agent that is discretely subsistent in the toner image receiving layer is uninvolved in the separation. There is consequently a demand for a comparatively large amount of release agent in the image receiving sheet used in the conventional electrophotographic process of the type using fixing rollers and, as a result, the image receiving sheet with a toner image receiving layer looses its significant feature, i.e. glossiness, and provides an image different in feeling from a photographic image.

On the other hand, in the case of an image receiving sheet for use in the electrophotographic process of the type using a fixing belt, the image receiving sheet is heated while it remains in contact with the fixing belt and is thereafter separated from the fixing belt after cooling. Accordingly, the toner image receiving layer is heated for a period of time longer than the fixing belt prior to cooling and separation of the image receiving sheet. During this process, a release agent discretely subsistent in the toner image receiving layer is heated and melts and then, in some cases, separates out from the toner image receiving layer according to types. The release agent separates out from the toner image receiving layer, that is unevenly distributed on the surface of the toner image receiving layer, is cooled and solidified and forms a solid layer over the toner image receiving layer, so that almost all the release agent is instrumental in separation of the image receiving sheet from the fixing belt. Accordingly, in the electrophotographic process of the type using a fixing belt, it is expected to provide the image receiving sheet with a sufficient separation effect with a less amount of release agent when the release agent is appropriately selected. In other words, the image receiving sheet keeps up its offset resistance (which shall mean and refer to the degree of renitency against fractional reverse transfer of a toner image or a toner layer to the fixing belt) and glossiness and provides an image having an abundance of photographic feeling due to an appropriately selected type and an optimized amount of release agent.

SUMMARY OF THE INVENTION

It is an object of the present invention to provide an electrophotographic image receiving sheet for use with a fixing belt type electrophotographic apparatus.

It is another object of the present invention to provide an electrophotographic image receiving sheet with a toner image receiving layer containing a release agent that separates out from and is unevenly distributed on the toner image receiving layer to form a layer of release agent over the toner image receiving layer with the result of stably transporting the electrophotographic image receiving sheet without offset of toner to a fixing belt and providing a favorable glossy image with a photographic quality.

It is still another object of the present invention to provide an electrophotographic image receiving sheet with a toner image receiving layer containing a release agent whose content is optimized for prevention of offset of toner to a fixing belt and a fixing roller.

It is a further object of the present invention to provide an electrophotographic image receiving sheet that is stably transported without offset of toner to a fixing belt and a fixing roller and provides a favorable glossy image with a photographic quality even when it is used in an electrophotographic apparatus equipped with an oilless fixing belt.

According to one aspect of the present invention, the foregoing objects of the present invention are accomplished by an electrophotographic image receiving sheet having a toner image receiving layer formed on a support for use with a fixing belt type electrophotographic apparatus. The toner image receiving layer contains a release agent and satisfies the following condition:

$$\gamma sp^0 - \gamma sp^1 \geqq 2.5[\mathrm{mJ/m^2}]$$

where $\gamma sp^0$ is the value of a polar component of surface free energy of the toner image receiving layer before heating the photoelectric image receiving sheet in the unit of $mJ/m^2$, and $\gamma sp^1$ is the value of a polar component of surface free energy of the toner image receiving layer after having heated the photoelectric image receiving sheet to 120° C. and then cooled it to 25° C. in the unit of $mJ/m^2$.

The toner image receiving layer preferably further satisfies the following condition:

$$\theta^1-\theta^0\geqq 5[°]$$

where $\theta^1$ is the contact angle of water on a surface of the toner image receiving layer in the unit of ° (degree), and $\theta^1$ is the contact angle of water on the surface of the toner image receiving layer in the unit of ° (degree) when the electrophotographic image receiving sheet has been heated to 120° C. and subsequently cooled to 25° C.

The release agent preferably comprise at least one selected group of silicone compound, fluorocarbon compound, wax and a matt agent. The wax may comprise either one of natural vegetable wax such as carnauba wax having a melting temperature in a range of from 70 to 95° C. and natural mineral wax such as montan wax having a melting temperature in a range of from 70 to 95° C.

The toner image receiving layer may contain a thermoplastic resin that is of a type of self-dispersed aqueous polyester resin emulsion having the following properties (1) to (4):

(1) a number-average molecular weight in a range of from 5000 to 10000;

(2) a molecular weight distribution (a ratio of a weight-average molecular weight relative to a number-average molecular weight) equal to or less than 4;

(3) a glass-transition temperature in a range of from 40 to 100° C.; and (4) a volumetric average particle diameter in a range of from 20 to 200 nmø.

The support may comprise one of base paper, synthetic paper, a synthetic resin sheet, coated paper and laminated paper. In this case that is preferable, the toner preferably contains at least a binding resin and a coloring agent and has a volumetric mean particle size in a range of from 0.5 to 10 μm and a volumetric average grain size distribution index being less than 1.3 and has a ratio of the volumetric average grain size distribution index relative to a number average grain size distribution index equal to or greater than 0.9. Further, the toner is preferably manufactured by a method including at least a process of preparing a dispersion liquid of coagulated resin particles by forming the coagulated resin particles in a dispersion liquid of resin particles, a process of forming particulate-adhered coagulated particles by mixing the dispersion liquid of coagulated resin particles with a dispersion liquid of particulates, and a process of forming toner particles by heating and melting the particulate-adhered coagulated particles.

The toner may further contain at least a binding resin and a coloring agent and has a volumetric average particle size in a range of from 0.5 to 10 μm and an average of profile factors in a range of from 1.00 and 1.50, the profile factor being defined by the following expression $$(\pi\times L^2)/(4\times L)$$

where L and S are the greatest length and the projected area of toner particle, respectively.

According to another aspect of the present invention, the foregoing objects of the present invention are accomplished by an electrophotographic image forming method for use with the electrophotographic image receiving sheet described above which comprises the steps of heating and pressurizing a surface of the electrophotographic image receiving sheet with a toner image formed thereon with the fixing belt and a roller, cooling the electrophotographic image receiving sheet; and peeling off the electrophotographic image receiving sheet from the fixing belt. The electrophotographic image forming method may further comprise the step of fixing the toner image formed on the electrophotographic image receiving sheet with a heating roller before fixing heating and pressurizing the surface of the electrophotographic image receiving sheet.

In the electrophotographic image forming method, the electrophotographic image receiving sheet is cooled desirably to a temperature lower than either one of a melting temperature of a binder resin contained in the toner and a temperature lower than a temperature 10° C. higher than a glass-transition temperature of the binder resin that is lower than the other.

The fixing belt may have a uniform thickness layer of fluorocarbone siloxane rubber formed thereon, or otherwise, may further have a uniform thickness layer of fluorocarbone siloxane rubber, such as having a perfluoroalkyl ether group and/or perfluoroalkyl group in a principal chain, formed over the uniform thickness layer of silicone rubber.

According to the electrophotographic image receiving sheet, the electrophotographic image receiving sheet is provided with high offset resistance by appropriately selecting a release agent of toner that causes a significant change in surface free energy of the toner image receiving layer or in contact angle of the toner image receiving layer with water before and after heating even though the image receiving layer contains only a small amount of release agent. As a result, undesirable the electrophotographic image receiving sheet is prevented from causing fractional reverse transfer of a fixed toner image or the toner image receiving layer to the fixing belt, and stable quality images can be reproduced even when a great number of the electrophotographic image receiving sheets are processed over a long period.

Further, according to the image forming method for use with the electrophotographic image receiving sheet, the electrophotographic image receiving sheet with a toner image formed thereon is heated and pressurized by the fixing belt and roller and separated from the fixing belt after cooling. Accordingly, the electrophotographic image receiving sheet is prevented from causing offset or separation of toner from the toner image receiving layer. This leads to a quality glossy image like a photographic image.

BRIEF DESCRIPTION OF THE DRAWINGS

The above and other objects of the present invention will be fully understood from the following description of the embodiments thereof when reading in conjunction with the accompanying drawings, in which.

DETAILED DESCRIPTION OF THE INVENTION

[Electrophotographic Image Receiving Sheet]

Figure 1:
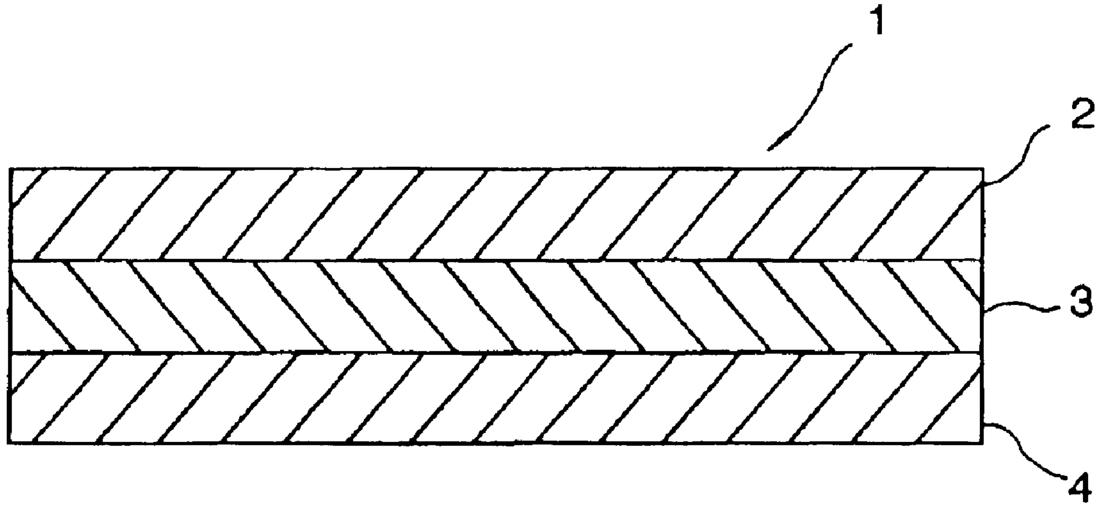
FIG. 1 is a schematic cross-sectional view of an electrophotographic image receiving sheet according to an embodiment of the present invention.

Referring to the drawings in detail, and, in particular, to FIG. 1 showing an electrophotographic image receiving sheet 1 used for an electrophotographic apparatus of the type having a fixing belt (which is hereafter referred to as a fixing belt type electrophotographic apparatus), the electrophotographic image receiving sheet 1 comprises a support 3, a toner image receiving layer 2 coated on one surface of the support 3 and, if necessary, a backing layer 4 coated on another surface of the support 3. The toner image receiving layer 2 contains a release agent. The electrophotographic image receiving sheet 1 may be provided with other various layers such as a surface protective layer, an intermediate layer, an under coating layer, a cushioning layer, an antistatic control or antistatic layer, a reflection layer, a color control layer, a storage stability improvement layer, an antiadhesion layer, an anticurling layer, a smoothing layer, etc., individually or in any combination.

<Support>

The support 3, on which no particular limitation is imposed, can be selected without any particular restrictions for any purpose. There are available various papers and sheets such as body paper, synthetic paper, synthetic resin sheets, coated paper, laminated paper and the like. Any support may be of either a single layer structure or of a laminated structure.

A description is hereafter provided to materials for the support 3.

Body Paper:

Materials for conventionally known body paper and synthetic paper are selectively used without any particular limitations. The materials include natural pulp made from needle-leaved trees or broadleaf trees, synthetic plastic pulp such as polyethylene and polypropylene, or mixtures of natural pulp and synthetic pulp. Pulp desirably utilized as a body paper material is bleached kraft pulp of a broadleaf tree (LBKP) in terms of improving surface smoothness, stiffness, dimensional stability (curling performance) of a body paper all together in a balanced manner and to a sufficient extent. However, it is allowed to utilize bleached kraft pulp of a needle-leaved trees (NBKP) or sulphite pulp of a broadleaf tree (LBSP). Further, in light of short fiber length, it is preferred to utilize pulp of a broadleaf tree as a major material. The pulp is pre-treated in a beater mill or a refining mill. A slurry of refined pulp (which is, in some cases, referred to as a pulp slurry) is added with various additives such as a filler, a dried strength enhancement agent, a sizing agent, wet strength enhancement agent, a fixing agent, a pH regulator, and other conditioners. Preferred examples of filler include, but not limited to, calcium carbonate, clay, kaoline, white earth, talc, titanium oxides, diatomaceous earth, barium sulfite, aluminum hydroxides, magnesium hydroxides and the like. Preferred examples of dried strength enhancement agent include, but not limited to, cation-exchanged starch, cation-exchanged polyacrylamide, anion-exchanged polyacrylamide, ampholytic polyacrylamide, carboxy-modified polyvinyl alcohol and the like. Preferred examples of sizing agent include, but not limited to, rosin derivatives such as fatty acid salt, rosin, rosin maleate, etc., paraffin wax, and compounds having a higher fatty acid such as alkylketenedimer, alkenyl, anhydrous succinic acid (ASA), epoxidized fatty acid amide, etc. Preferred examples of wet strength enhancement agent include, but not limited to, polyamine polyamide epichlorohydrin, melamine resin, urea resin, epoxidized polyamide resin, etc. Preferred examples of fixing agent include, but not limited to, metallic salt such as aluminum sulfate, aluminum chloride, polyvalent, cationic polymers such as cation-exchanged starch, etc. Preferred examples of pH regulator include, but not limited to, caustic soda, sodium carbonate, etc. Preferred examples of additional conditioner include, but not limited to, defoamer, dye, slime controllers, fluorescent brightener, etc. Further, if necessary, the pulp slurry may be added with a softening agent such as described in, for example, New Paper Coating Handbook, pages 554 to 555 (published 1980 by Paper and Chemicals Times).

A solution used in surface sizing treatment may contain water-soluble polymers, a sizing agent, a water-resisting material, pigment, pH regulator, dye, fluorescent brightener, etc. Preferred examples of water-soluble polymer include, but not limited to, cation-exchanged starch, polyvinyl alcohol, carboxy-modified polyvinyl alcohol, carboxy methyl cellulose, hydroxy ethyl cellulose, cellulose sulfate, gelatin, casein, sodium polyacrylic acid, sodium styrene-dehydrated maleic copolymer, sodium polystyrene sulfonate, etc. Preferred examples of water-resisting material include, but not limited to, latex emulsions such as styrene-butadiene copolymers, ethylene-vinyl acetate copolymers, polyethylene, vinyliden chloride copolymers and the like, polyamide polyamine epichlorohydrin, etc. Preferred examples of pigment include, but not limited to, calcium carbonate, clay, kaoline, talc, barium sulfite, titanium oxides, etc.

Materials for the body paper include synthetic pulp paper, mixed natural and synthetic pulp paper and various duplex paper in addition to the natural pulp paper described above.

In light of improving stiffness and dimensional stability (curling performance) of the image receiving sheet for use in the electrophotographic process, it is desirable for the body paper to have a Young's modulus ratio Ea/Eb (Ea: Young's modulus in lengthwise direction; Eb: Young's modulus in crosswise direction) between 1.5 and 2.0. If the upper and/or lower limits are exceeded, the image receiving sheet is apt to cause deterioration of stiffness and curling performance which undesirably works against transportability.

The body paper used for the image receiving sheet 1 has an image side surface (on which the toner image receiving layer 2 is applied) with an smoothness by Oken scale (which is a value measured in conformity with JAPAN TAPPI Rule No. 5 B and hereafter referred to as an Oken smoothness) greater than 210 seconds that is significantly greater as compared with conventionally applied image surface smoothness, and more desirably greater than 250 seconds. If the Oken smoothness is less than 210 seconds, the image receiving sheet 1 causes qualitative defects of toner image. The imager receiving sheet 1 with a toner image layer 2 applied to a body paper having an Oken smoothness greater than 20 seconds achieves intended effects. Although there is no upper limit bound by Oken smoothness, however, the Oken smoothness is practically desirable to be less than 600 seconds, and more desirably to be less than 500 seconds.

It has been known in general that stiffness of paper is different according to types of refining of pulp from which the paper is made. An elastic modulus of paper that is made from refined pulp can be used as a key factor representing the degree of stiffness of paper that is made from refined pulp. In particular, elastic force (elastic modulus) of paper can be found on the basis of a velocity of sound wave that is generated by an ultrasonic transducer and propagated through the paper utilizing the relationship between a dynamic modulus of elasticity which is one of visco-elastic solid state properties of paper and density. That is, the elastic modulus of paper is given by the following numerical expression:

$$E=\rho c^2(1-n^2)$$

where E is a dynamic modulus of elasticity;

ρ is a density;

c is a velocity of sound wave propagated through paper;

n is a Poisson's ratio.

In this instance, the elastic modulus of paper can be approximately calculated from the following numerical expression in view of the fact that ordinary paper has a Poisson ratio of approximately 0.2:

$$E=\rho c^2$$

That is, the elastic modulus of paper can be easily obtained when density and a velocity of sound wave are found. A velocity of sound wave propagated through paper is measured by various commercially available instruments known in the art. For example, Sonic Tester SST 110 manufactured by Nomura Corporation Co., Ltd. may be used.

The body paper is needed to have a thickness desirably from 30 to 500 $\mu$m, and more desirably from 100 to 250 $\mu$m and a basic weight desirably from 50 to 250 g/cm$^2$, and more desirably from 100 to 200 g/cm$^2$. Preferred examples of such body paper include, but not limited to, quality paper and paper such as listed in Fundamental Photographic Engineering—Silver Salt Photography—, pages 223–240, edited by Japan Photographic Society (Published 1978 by CORONASHA Co., Ltd.).

In order to provide a surface of the body paper with a desired centerline average roughness, it is preferred to use pulp with a distribution of fiber length (e.g. the total of a residual volume of 24-mesh screened fibers and a residual volume of 42-mesh screened fivers is from 20 to 45 weight % and a residual volume of 24-mesh screened fibers is 5 weight %) such as described in, for example, Japanese Unexamined Patent Publication No. 58-68037. The centerline average roughness can be regulated by treating the surface with heat and pressure using a machine calender or a super calender.

Synthetic Resin Sheet

Preferred examples of material for the synthetic resin sheet include, but not limited to, polyolefin resin such as a polypropylene resin, polyester resin such as a polyethylene terephthalate resin. The synthetic resin sheet is made from the material using sheet forming extrusion.

Coated Paper

The coated paper is a paper or a sheet that is made by applying coating of one of various resin, desirably thermoplastic resins, rubber latex and polymeric materials to either or both surfaces of a paper such as a body paper. The amount of coating is different according to intended use. Preferred examples of coated paper are art paper, cast-coated paper, Yankee paper, etc. A coating layer of thermoplastic resin is desirably from 5 to 100 $\mu$m, and more desirably from 15 to 50 $\mu$m. The coating layers of thermoplastic resin for the opposite surfaces of the paper or the sheet may be the same in component, solid state property, thickness and structure as each other or may be different in component, solid state property, thickness and structure from each other.

Preferred examples of thermoplastic resin are roughly divided into (1) to (8) groups.

(1) Polyethylene resin, polyolefin resin such as a polypropylene resin, resin of a copolymer of olefin such as ethylene or propylene and a vinyl monomer.

(2) Thermoplastic resin having ester bonds: e.g. polyester resin yielded in condensation of a dicarboxylic component (which may be substituted by a sulfonic acid group or a carboxyl group) and an alcohol component (which may be substituted by a hydroxyl group), polyacrylic ester resin or polymethacrylic ester resin such as polymethylmethacrylate, polybutylmethacrylate, polymethylacrylate, polybutylacrylate, etc., polycarbonate resin, polyvinyl acetate resin, styreneacrylate resin, styrene-methacrylic ester copolymers, vinyltoluene acrylate resin, etc.

More specific examples of thermoplastic resin are disclosed in, for example, Japanese Unexamined Patent Publications Nos. 59-101395, 60-294862, 63-7971, 63-7972 and 63-7973. Commercially available thermoplastic resin include, but not limited to, Vyron 103, 200, 280, 290, 300, GK-130 and GK-140 (which are manufactured by Toyobo Co., Ltd.); Tafuton NE-382, U-5, ATR-2009 and ATR-2010 (which are manufactured by Kao Co., Ltd.); Elitel UE3500, UE3210, XA-8153, KZA-7049 and KZA-1449 (which are manufactured by Unitika Ltd.); Polyester TP-220 and R-188 (which are manufactured by Nippon Synthetic Chemical Industry Co., Ltd.); thermoplastic resins of Hyros series (which are manufactured by Seiko Chemical Industry Co., Ltd.);

(3) Polyurethane Resin;

(4) Polyamide resin, Urea resin;

(5) Polysulfone resin;

(6) Polyvinyl chloride resin, polyvinyliden chloride resin, vinyl chloride-vinyl acetate copolymer resin, vinyl chloride-vinyl propionate copolymer resin;

(7) Polyol resin such as polyvinyl butyral, cellulose resin such as ethyl cellulose resin, cellulose acetate resin;

(8) Polycaprolactone resin, styrene-maleic anhydride resin, polyacrilonitrile resin, polyether resin, epoxy resin, phenolic resin.

These thermoplastic resins may be used individually or in any combination of two or more.

Laminated Paper

Laminated paper is a sheet made by laminating a sheet of body paper and a resin sheet or film, a rubber sheet or film, or a polymer sheet or film using laminate material such as polyolefin, polyvinyl chloride, polyethylene terephthalate, polystyrene, polymethacrylate, polycarbonate, polyimide, triacetylcellulose, etc., individually or in any combination of two or more.

Generally, the polyolefin is often prepared by the use of low density polyethylene. However, in order for the support 3 to have an improved heat tolerance, it is desirable to use polypropylene, a blend of polypropylene and polyethylene, higher density polyethylene, a blend of higher density polyethylene and low density polyethylene, etc. In particular, the blend of higher density polyethylene and low density polyethylene is more desirable in light of cost and laminating suitability. The blending ratio (weight ratio) of higher density polyethylene to low density polyethylene is desirably between 1:9 and 9:1, more desirably between 2:8 and 8:2, and most desirably between 3:7 and 7:3. In the case where the support 3 at opposite sides is coated with thermoplastic resin layer, the support 3 at the back side (opposite to the image receiving side) is preferred to be made of higher density polyethylene or a blend of higher density polyethylene and low density polyethylene. In this instance, the polyethylene is not bound by molecular weight and is, however, desirable to have a melt index between 1.0 to 40 g per 10 minutes, either higher density or low density, and good extrusion suitability. These sheets or films may be treated so as to have white reflexivity. This treatment is achieved by mixing pigment such as titanium oxide in the sheet or the film.

The resin for coating or lamination is not limited to thermoplastic resin and may include a resin that is produced by polymerizing monomers with heat or light and a resin that is produced from a thermoplastic resin added with a hardning agent or a crosslinking agent and thereafter reacted with heat or light. At least one of coating layers or laminated layers may be of a monomer containing a photopolymerization initiator or a resin composition cured with ultraviolet radiation. In this instance, exemplified as the resin composition is a resin containing an electron radiation curing organic compound as a primary component. The electron radiation curing organic compound is not particularly bounded by type, monomer or oligomer, and used individually or in any combination of two or more.

The electron radiation curing organic compound may be chosen from the following groups (1) to (7) of compound.

(1) Acrylic compounds of mono- to hexa-alcohol and polyalkylene glycol of fatty series, alicyclic series or aromatic fatty series;
(2) Acrylic compounds of mono- to hexa-alcohol of fatty series, alicyclic series or aromatic fatty series added with an additive of alkylene oxide;
(3) Polyacryloyl alkyl phosphoric esters;
(4) Reaction product of carboxylic acid, polyol and acrylic acid;
(5) Reaction product of isocyanate, polyol and acrylic acid;
(6) Reaction product of epoxy compound and acrylic acid;
(7) Reaction product of epoxy compound, polyol and acrylic acid.

Specific examples of these electron radiation curing organic compounds include, but not limited to, polyoxyethylene epichlorohydrin-modified bisphenol A diacrylate, dicyclohexyl acrylate, epichlorohydrin-modified polyethylene glycol diacrylate, 1,6-hexane diol diacrylate, hydroxy bivaline acid ester neopentyl glycol diacrylate, nonylphenoxy polyethylene glycol acrylate, ethylene oxide-modified phenoxide phosphate acrylate, ethylene oxide-modified phthalic acrylate, ethylene oxide-modified phtalic acrylate, polybutadiene acrylate, caprolactam-modified tetrahydrofurfuryl acrylate, tris(acryloxyethyl) isocyanurate, trimethylol propane triacrylate, pentaerythritol triacrylate, pentaerythritol tetraacrylate, pentaerythritol pentaacrylate, dipentaerythritol hexaacrylate, polyethylene glycol diacrylate, 1,4-butadiene diol diacrylate, neopentyl glycol diacrylate, neopentyl glycol-modified trimethylol propane diacrylate, etc. These organic compounds can be used individually or in any combination of two or more.

The ultraviolet curing organic compound for the resin layer for coating or lamination is not particularly bounded by type. The ultraviolet curing resin composition is prepared by appropriately adding a photo-polymerization initiator to the electron radiation curing organic compounds described above. The resin composition used in electron radiation curing may or may not contain a photo-polymerization initiator. The amount of photo-polymerization initiator is desirable to be within a range where it does not emit a foul odor.

Preferred examples of photo-polymerization initiator include, but not limited to, those well known in the art or, specifically, ethyl anthraquinone; acetophenones such as methyl benzoylformate, 1-hydroxy cyclohexyl phenylketone, anthophenone, diethoxy anthophenone and trichloroacetphenone; o-benzoyl methyl benzoate; benzophenone; Michler's ketone; benzyl; benzoin, benzoin alkyl ether; benzyl dimethyl ketal; xanthone; thioxanthones; benzophenones; azo compounds; etc. These photo-polymerization initiators can be used individually or in any combination of two or more. The amount of photo-polymerization initiator is desirably 0.1 to 10 weight % relative to the ultraviolet curing resin. It is desirable to use a photo-polymerization accelerator well known in the art, such as N-methyl diethanolamine or bisdiethyl amino benzophenone together with the photo-polymerization initiator. The photo-polymerization accelerator is not always bounded by added amount as long as bringing out its accelerative effect. Generally it is desirable to use the photo-polymerization accelerator approximately 0.5 to 2 times as much as the photo-polymerization initiator.

Electron accelerator used for electron irradiation is not particularly bounded by type. Preferred examples of electron beam accelerator are the Van de Graaff scanning type of electron irradiator, the double scanning type of electron irradiator, the curtain beam scanning type of electron irradiator, and the like. Ultraviolet irradiator is not particularly bounded by type. Preferred examples of ultraviolet irradiator are low-pressure mercury lamps, medium-pressure mercury lamps, high-pressure mercury lamps, metal halide lamps, etc.

The support 3 may be a laminated support of various supports. For applying resin coating to the base paper, it is preferred to apply a resin solution or a resin suspension to the base paper, to spray it on the base paper, or otherwise to impregnate the base paper with a resin solution or a resin suspension. It is desirable to apply activation treatment such as corona discharge treatment, flame treatment, glow discharge treatment, or plasma treatment to either one or both of opposite surfaces of the base paper for the purpose of improving adhesiveness of the resin coating layer or the laminated layer with the base paper. It is also desirable to apply surface treatment such as corona discharge treatment or a base coating layer to a surface of the base paper, the synthetic paper, or the synthetic resin sheet or to the coating layer or the laminated layer formed on the base paper, the synthetic paper, or the synthetic resin sheet.

If necessary, the thermoplastic resin layer applied to the coated paper may be finished to a desired surface texture such as a glossy surface, a fine surface such as disclosed in, for example, Japanese Unexamined Patent Publication No. 55-26507, a matted surface, or a silk surface. The thermoplastic resin layer at a back surface that is opposite to a surface to which a conductive coating layer is applied if necessary may be finished to a non-glossy surface. In addition, treatment for activation such as corona discharge treatment or flame cleaning may be applied to the finished surface of the thermoplastic resin layer. Thereafter, under coating such as disclosed in, for example, Japanese Unexamined Patent Publication No. 61-846443 may further be applied to the activated surface of the thermoplastic resin layer. These treatments can be applied individually or in combination of two or more. The thermoplastic resin layer may contain various additives appropriately selected within the realm of meeting the purpose of the present invention.

The support 3 has a thickness desirably between 25 $\mu$m and 300 $\mu$m, more desirably between 50 $\mu$m and 260 $\mu$m, and most desirably between 75 $\mu$m and 220 $\mu$m, and may have stiffness according to types of usage. In the case of a support for an electrophotographic image receiving sheet having a photographic image quality, the support is preferred to be proximate to those for sliver color films.

The support 3 has a coefficient of thermal conductivity desirably higher than 0.50 kcal/m·h·° C. and a mass density higher than 0.7 g/cm$^3$, both in light of fixing performance. In this instance, the coefficient of thermal conductivity can be obtained by measuring a transfer paper moisture-conditioned in conformity with JIS (Japanese Industrial Standard) P 8111 using the method disclosed in Japanese Unexamined Patent Publication No. 53-66279.

The support 3 may contain various additives appropriately selected within the realm of meeting the purpose of the present invention. Preferred examples of additive include, but not limited to, a brightening agent, a conductive agent, a filler, a titanium oxide, a dried strength enhancement agent, a sizing agent, wet strength enhancement agent, a fixing agent, a pH regulator, and other conditioners. Preferred examples of filler include, but not limited to, calcium carbonate, clay, kaoline, white earth, talc, titanium, ultramarine, pigment such as carbon black and the like, dye, etc.

The support may contain a hydrophilic binder, a semi-conductive metallic oxide such as an alumina sol and a tin oxide, an antistatic agent such as carbon black, etc., and/or or may have a coating of them applied to wither one or both of the front and rear surfaces. Specifically, employable is the support disclosed in Japanese Unexamined Patent Publication No. 63-220246. The support 3 is desirable to be resistant to heat for fixation and to fulfill requirements for brightness, sliding ability, frictionizing ability, antielectrostatic ability, easiness of denting after fixation.

<Toner Image Receiving Layer>

The toner image receiving layer 2, that is a receptor to color toner and/or black toner for forming an image, has functions of receiving toner particles from an intermediate transfer sheet or a developing drum by the aid of electricity or static electricity and pressure in a transfer printing process and fixing the toner image with heat and pressure in a fixing process.

Thermoplastic Resin

The toner image receiving layer 2 contains a thermoplastic resin. There is no particular limitation imposed on the thermoplastic resin inasmuch as long as it is deformable under a temperature condition for fixing the toner image. Although various thermoplastic resin can be selected within the realm of meeting the purpose of the present invention, it is desirable to employ a resin similar to that used as a toner binder. The thermoplastic resin for the toner image receiving layer 2 is desirably the same as that used often for the toner binder, i.e. a polyester resin or a copolymer resin such as styrene or styrene-butyl acrylate, or otherwise may be desirable styrene, a copolymer of styrene-butyl acrylate, a copolymer of styrene-acrylic ester or a copolymer of styrene-methacrylic ester. It is preferred for the toner image receiving layer to contain the thermoplastic resin more than 20 weight %.

Preferred examples of thermoplastic resin for the toner image receiving layer 2 include, but not limited to, (a) resins having an ester bond, (b) polyurethane resins, (c) polyamide resins, (d) polysulfone resins, (e) polyvinylchloride resins, (f) polyvinyl butyral, (g) polycaprolactone resins and (h) polyolefin resins.

Specifically, preferred examples of (a) resin having an ester bond include, but not limited to, a polyester resin yielded in condensation of a dicarboxylic acid component (which may be substituted by a sulfonic acid group or a carboxyl group) such as terephthalic acid, isophthalic acid, maleic acid, fumaric acid, phthalic acid, adipic acid, sebacic acid, azelaic acid, abietic acid, butanedioic acid, trimellitic acid, pyromellitic acid and an alcohol component (which may be substituted by a hydroxyl group) such as ethylele glycol, diethylene glycol, propylene glycol, bisphenol A, a dieter derivative of bisphenol A (which is, for example, ethylene oxide adduct or plopylene oxide adduct), bisphenol S, 2-ethyle cyclohexyl dimethanol, neopentyl glycol, cyclohexyl dimethanol, glycerin; polyacrylic ester resin or polymethacrylic ester resinuch as polymethyl methacrylate, polybutyl methacrylate, polymethyl acrylate, polybutyl acrylate; polycarbonate resin; polyvinyl acetate resin; styrene acrylate resin; styrene-methacrylic ester copolymer resin; vinyl tolueneacrylate; etc. More specific examples include, but not limited to, those disclosed in Japanese Unexamined Patent Publication Nos. 59-101395, 60-294862, 63-7971, 63-7972 and 63-7973.

Commercially available polyester resin include, but not limited to, Vyron 103, 200, 280, 290, 300, GK-130 and GK-140 (which are manufactured by Toyobo Co., Ltd.); Tafuton NE-382, U-5, ATR-2009 and ATR-2010 (which are manufactured by Kao Co., Ltd.); Elitel UE3500, UE3210 and XA-8153 (which are manufactured by Unitika Ltd.); Polyester TP-220 and R-188 (which are manufactured by Nippon Synthetic Chemical Industry Co., Ltd.); etc. Commercially available acryl resin include, but not limited to, Dianal SE-5437, SE-5102, SE-5377, SE-5649, SE-5466, SE-5482, HR-169, HR-124, HR-1127, HR-116, HR-113, HR-148, HR-131, HR-470, HR-634, HR-606, HR-607, LR-1065, LR-574, LR-143, LR-396, LR-637, LR-162, LR-469, LR-216, BR-50, BR-52, BR-60, BR-64, BR-73, BR-75, BR-77, BR-79, BR-80, BR-83, BR-85, BR-87, BR-88, BR-90, BR-93, BR-95, BR-100, BR-101, BR-102, BR-105, BR-106, BR-107, BR-108, BR-112, BR-113, BR-115, BR-116 and BR-117 (which are manufactured by Mitsubishi Rayon Co., Ltd.); Esrex P SE-0020, P SE-0040, P SE-0070, P SE-0100, P SE-1010 and P SE-1035 (which are manufactured by Sekisui Chemical Co., Ltd.); Hymar ST95 and ST120 (which are manufactured by Sanyo Chemical Industry Co., Ltd.); FM601 (which are manufactured by Mitsui Chemical Co., Ltd.); etc.

Preferred examples of (e) polyvinyichloride resin for the toner image receiving layer 2 include, but not limited to, polyvinylden chloride resin, vinyl chloride-vinyl acetate copolymer resin, vinyl chloride-vinyl propionate copolymer resin, etc.

Preferred examples of (f) polyvinyl butyral for the toner image receiving layer 2 include, but not limited to, polyol resin, ethyl cellulose resin, cellulose resin such as cellulose acetate resin, etc. Commercially available polyvinyl butyral include, but not limited to, Denka Butyral 3000-1, 40002, 5000A and 6000C (which are manufactured by Denki Kagaku Kogyo K.K.); Esrex BL-1, BL-2, BL-3, BL-S, BX-L, BM-1, BM-2, BM-5, BM-S, BH-3, BX-1 and BX-7 (which are manufactured by Sekisui Chemical Co., Ltd.); etc. These polyvinyl butyral have a polyvinyl butyral content greater than 70 weight % and an average degree of polymerization desirably higher than 500 and more desirably higher than 1000.

Preferred examples of (g) polycaprolactone resin for the toner image receiving layer 2 include, but not limited to, styrene-maleic anhydride resin, polyacrylonitrile resin, polyether resin, epoxy resin, phenol resin, etc.

Preferred examples of (h) polyolefin resin for the toner image receiving layer 2 include, but not limited to, polyethylene resin, polypropylene resin, a copolymer resin of olefin such as ethylene and propylene and vinyl monomer, acrylic resin, etc.

These thermoplastic resins may be used individually or in any combination of two or more.

It is preferred to employ a thermoplastic resin that fulfills solid state properties required for the toner image receiving layer 2 by itself, or otherwise it is allowed to combine two or more thermoplastic resins which meet different solid state properties required for the toner image receiving layer 2.

It is preferred for the thermoplastic resin for the toner image receiving layer 2 to have a molecular weight greater than the thermoplastic resin used for toners. However, according to the correlation between thermodynamic properties of these two thermoplastic resins for the toners and the toner image receiving layer 2, that relationship of molecular weight between them is not always preferred. For example, in the case where the thermoplastic resin for the toner image receiving layer 2 has a melting temperature higher than the other, it is desirable for the resin for the toner image receiving layer 2 to have the same molecular weight as the other or a molecular weight greater than the other depending upon circumstances. It is also desirable to use a mixture of thermoplastic resins that are the same in composition as each other but different in average molecular weight from each other. The molecular weight of thermoplastic resin for toners is preferably determined according to the relationship disclosed in Japanese Unexamined Patent Publication No. 8-334915. The distribution of molecular weight is desirably wider for of the thermoplastic resin for the toner image receiving layer 2 than that for the toners. Solid state properties that the thermoplastic resin for the toner image receiving layer 2 has to fulfill are those disclosed in, for example, Japanese Patent Publication No. 5-127413 and Japanese Unexamined Patent Publication Nos. 8-194394, 8-334915, 8-334916, 9-171265 and 10-221877.

The thermoplastic resin for the toner image receiving layer 2 is of an aqueous type such as a water-soluble resin or a water-dispersible resin for the following reasons (i) and (ii):

(i) The aqueous resin spins off no organic solvent emissions in the coating and drying process and, in consequence, excels at environmental suitability and workability;

(ii) A release agent such as wax is hardly soluble in water at an ambient temperature in many instances and is dispersed in a solvent such as water or an organic solvent prior to use.

The water-dispersible type is stable and excel at manufacturing process suitability. In addition, wet coating makes wax easily bleed onto a surface during a coating and drying process, so as thereby to bring out the effect of release agent (offset resistance, adhesion resistance, etc.).

The aqueous resin is not always bounded by composition, bond-structure, molecular geometry, molecular weight, molecular weight distribution, etc. as long as it is of the water-soluble type or the water-dispersible type. Examples of hydrophilic or water-attracting group include, but not limited to, a sulfonic acid group, carboxylic acid group, an amino group, an amid group, an ether group, etc.

Preferred examples of water-soluble resin include, but not limited to, those disclosed in Research Disclosure No. 17,643, page 26, No. 18,716, page 651, No. 307,105, pages 873–874, and Japanese Unexamined Patent Publication No. 64-13546. Specifically, preferred examples of water-soluble resin include, but not limited to, vinyl pyrrolidone acetate copolymer, styrene-vinyl pyrrolidone copolymer, styrene maleic anhydride copolymer, water-soluble polyester, water-soluble acryl, water-soluble polyurethane, water-soluble nylon, water-soluble epoxy resin, etc. Gelatin is selected from a group of lime-treated gelatin, acid-treated gelatin, what is called delimed gelatin that has a reduced lime content. These gelatin may be used individually or in any combination. Commercially available gelatin include, but not limited to, various types of Pluscoat (which are manufactured by Gao Chemical Industry Co., Ltd.) and gelatin of Fintex ES series (which are manufactured by Dainippon Ink & Chemical Inc.), both of which are of water-soluble polyester; gelatin of Jurimar AT series (which are manufactured by Nippon Fine Chemical Co., Ltd.); Fintex 6161 and K-96 (which are manufactured by Dainippon Ink & Chemical Inc.); and Hyros NL-1189 and Hyros BH-997L (which are manufactured by Seiko Chemical Industry Co., Ltd.); all of which are of water-soluble acryl.

Preferred examples of water-dispersible resin includes, but not limited to, water-dispersible resins such as water-dispersible acryl resin; water-dispersible polyester resin, water-dispersible polystyrene resin, water-dispersible urethane resin, etc; emulsions such as an acryl resin emulsion, a polyvinyl acetate emulsion, an SBR (styrene.butadiene.rubber) emulsion, etc; a water-dispersible or an emulsion of the thermoplastic resin listed above as preferably used for the toner image receiving layer 2 (i.e. resin having an ester bond, polyurethane resin, polyamide resin, polysulfone resin, polyvinylchloride resin, polyvinyl butyral, polycaprolactone resin and polyolefin resin). Otherwise, it is possible to use copolymers, mixtures or cation-modified resins of the thermoplastic resin listed above as preferably used for the toner image receiving layer 2 in combination of two or more.

Commercially available water-dispersible resin includes, but not limited to, resins of Vyronal series (which are manufactured by Toyobo Co., Ltd.), resins of Pesuresin A series (which are manufactured by Takamatsu Oil & Fats Co., Ltd.), resins of Tafuton UE series (which are manufactured by Kao Co., Ltd.), resins of Polyester WR series (which are manufactured by Nippon Synthetic Chemical Industry Co., Ltd.) and resins of Eliel series (which are manufactured by Unitika Ltd.), all of which are of polyester, and resins of Hyros XE, KE and PE series (which are manufactured by Seiko Chemical Industry Co., Ltd.) and resins of Jurimar ET series (which are manufactured by Nippon Fine Chemical Co., Ltd.), all of which are of acrylic. A melt flow temperature (MFT) of polymer film is desirably higher than an ambient temperature for storage before printing and higher than 100° C. for fixing toner particles.

It is preferred to employ a self-dispersed aqueous thermoplastic resin emulsion having the following characteristics (1)–(4) as the aforementioned thermoplastic resin. This is because a self-dispersed type emulsion does not contain a surface active agent and, in consequence, has a low hydroscopicity even in a higher humid atmosphere and a low depression of melting point due to moisture, it is possible to put restraints on an occurrence of an offset during the toner fixation process and/or an occurrence of adhesion failure between sheets during storage. In addition, because of the aqueous type, the emulsion excels at environmental suitability and workability. Furthermore, because the emulsion comprises a polyester resin that is easy to have a molecular structure having higher cohesive energy, while the emulsion keeps sufficient hardness in a storage environment, it gets a molten state where it shows lower elasticity or viscosity in the toner fixation process of electrophotography, so as thereby to provide a sufficiently high quality of image resulting from that toner particles are buried into the image receiving layer.

(1) A number-average molecular weight (Mn) is desirably between 5000 and 10000 and more desirably between 5000 and 7000;

(2) A molecular weight distribution (Mw/Mn), that is a ratio of a weight-average molecular weight relative to a number-average molecular weight, is desirably equal to or less than 4 and more desirably equal to or less than 3;

(3) A glass-transition temperature (Tg) is desirably between 40 and 100° C. and more desirably 50 and 80° C.; and (4) A volumetric average particle diameter is desirably between 20 and 200 nmø and more desirably between 40 and 150 nmø.

Release Agent

The toner image receiving layer 2 is blended with a release agent for the purpose of preventing the toner image receiving layer 2 from causing an offset. The release agent is not bound by type as long as it melts at the same temperature as the fixing temperature and separates out unevenly onto a surface of the toner image receiving layer 2 and solidify, thereby to form a release agent layer on the toner image receiving layer 2. Examples of such a release agent having the above mentioned effects include, but limited to, silicon compounds, fluorine compounds, wax and a matt agent. It is preferred to use at least one or more selected from the group of silicone oil, polyethylene wax, carnauba wax, silicone particles and polyethylene particles.

Specifically, available as the release agent include compounds are disclosed in "Revised Edition: Property and Application of Wax" published by Koushobou and "Handbook Of Silicon" published by Nikkan Kogyo Shinbun and silicone compounds, fluorine compounds, wax (except natural wax) used for toners disclose in Japanese Patent Nos. 2838498 and 2949558; Japanese Patent Publication Nos. 59-38581 and 4-32380; Japanese Unexamined Patent Publication Nos. 50-117433, 52-52640, 57-148755, 61-62056, 61-62057, 61-118760, 2-42451, 3-41465, 4-212175, 4-214570, 4-263267, 5-34966, 5-119514, 6-59502, 6-161150, 6-175396, 6-219040, 6-230600, 6-295093, 7-36210, 7-43940, 7-56387, 7-56390, 7-64335, 7-199681, 7-223362, 7-287413, 8-184992, 8-227180, 8-248671, 8-2487799, 8-248801, 8-278663, 9-152739, 9-160278, 9-185181, 9-319139, 9-319413, 10-20549, 10-48889, 10-198069, 10-207116, 11-2917, 11-449669, 11-65156, 11-73049 and 11-194542. These compounds can be used individually or in combination of two or more.

Preferred examples of silicone compound include, but not limited to, non-modified silicone oil such as dimethyl siloxyane oil, methyl hydrogen silicone oil, phenylmetyl silicone oil (preferred examples of commercially available non-modified silicone oils include KF-96, KF-96L, KF-96H, KF-99, KF-50, KF-54, KF-56, KF-965, KF-968, KF-994, KF-995, HIVAC, F-4, F-5 which are manufactured by Shinetsu Chemical Industry Co., Ltd; SH200, SH203, SH490, SH510, SH550, SH710, SH704, SH705, SH7028A, SH7036, SM7060, SM7001, SM7706, SM7036, SH871107, SH8627 which are manufactured by Toray Dow Corning Silicone Co., Ltd., TSF400, TSF401, TSF404, TSF405, TSF431, TSF433, TSF434, TSF437, TSF450, TSF451, TSF456, TSF458, TSF483, TSF484, TSF4045, TSF4300, TSF4600, YF-33, YF-3057 YF-3800, YF-3802 YF-3804, YF-3807, YF-3897, XF-3905, XS69-A1753, TEX100, TEX101, TEX102, TEX103, TEX104, TSW831 which are manufactured by Toshiba Silicone Co., Ltd.); amino-modified silicone oil (preferred examples of commercially available amino-modified silicone oils include, but not limited to, KF-857, KF-858, KF-859, KF-861, KF-864 and KF-880 which are manufactured by Shinetsu Chemical Industry Co., Ltd., SF8417 and SM8709 which are manufactured by Toray Dow Corning Silicone Co., Ltd., and TSF4700, TSF4701, TSF4702, TSF4703, TSF4704, TSF4705, TSF4706, TEX150, TEX151 and TEX154 which are manufactured by Toshiba Silicone Co., Ltd.); carboxy-moified silicone oil (preferred examples of commercially available carboxy-moified include, but not limited to, BY-16-880 manufactured by Toray Dow Corning Silicone Co., Ltd., TFS4770 and XF42-A9248 which are manufactured by Toshiba Silicone Co., Ltd.); carbinol-modified silicone oil (preferred examples of commercially available carbinol-modified silicone oil includes, but not limited to, XF42-B0970 manufactured by Toshiba Silicone Co., Ltd.); vinyl-modified silicone oil (preferred examples of commercially available vinyl-modified silicone oil include, but not limited to, XF40-A1987 manufactured by Toshiba Silicone Co., Ltd.); epoxy-modified silicone oil (preferred examples of commercially available epoxy-modified silicone oil include, but not limited to, SF8411 and SF8413 which are manufactured by Toray Dow Coning Co., Ltd., and TSF3965, TSF4730, TSF4732, XF42-A4439, XF42-A4438, XF42-A5041, XC96-A4462, XC96-A4462, XC96-A4463, XC96-A4464 and TEX170 which are manufactured by Toshiba Silicone); polyether-modified silicone oil (commercially available polyether-modified silicone oil include, but not limited to, KF-351(A), KF-352(A), KF-353 (A), KF-354(A), KF-355(A), KF-615(A), KF-618(A) and KF-945(A) which are manufactured by Shinetsu Chemical Industry Co., Ltd, SH3746, SH3771, SH8421, SH8419, SH8400 and SH8410 which are manufactured by Toray Dow Corning Silicone Co., Ltd., and TSF4440, TSF4441, TSF4445, TSF4446, TSF4450, TSF4452, TSF4453 and TSF4460 which are manufactured by Toshiba Silicone Co., Ltd.); silanol-modified silicone oil; methacryl-modified silicone oil; mercapto-modified silicone oil; alcohol-modified silicone oil (commercially available alcohol-modified silicone oil include, but not limited to, SF8427 and SF8428 which are manufactured by Toray Dow Corning Silicone Co., Ltd., TSF4750, TSF4751 and XF42-B0970 which are manufactured by Toshiba Silicone Co., Ltd.); alkyl-modified silicone oil (commercially available alkyl-modified silicone oil include, but not limited to, SF8416 manufactured by Toray Dow Corning Silicone Co., Ltd., and TSF410, TSF411, TSF4420, TSF4421, TSF4422, TSF4450, XF42-334, XF42-A3160 and XF42-A3161 which are manufactured by Toshiba Silicone Co., Ltd.); fluorine-modified silicone oil (commercially available fluorine-modified silicone oil include, but not limited to, SF1265 manufactured by Toray Dow Corning Silicone Co., Ltd., and FQF502 manufactured by Toshiba Silicone Co., Ltd.); silicone rubber or silicone fine particles (commercially available silicone rubber or silicone fine particles include, but not limited to, SH851U, SH745U, SH55UA, SE4705U, SH502UA&B, SRX539U, SE6770-P, DY38-038, DY38-047, Trefil F-201, F-202, F-250, R-900, R902A, E-500, E-600, E-601, E-506 and BY29-119 which are manufactured by Toray Dow Corning Silicone Co., Ltd., and Tospal 105, 120, 130, 145, 250 and 3120 which are manufactured by Toshiba Silicone Co., Ltd.); silicone-modified resin such as olefin resin, polyester resin, vinyl resin, polyamide resin, cellulose resin, phenoxy resin, vinyl chloride-vinyl acetate resin, urethane resin, acryl resin, styrene-acryl resin and silicone-modified compounds of copolymers of these resins (commercially available silicone-modified resin include, but not limited to, Dialoma SP203, SP712, SP2105 and SP2023 which are manufactured by Dainichiseika Color & Chemicals Mfg. Co., Ltd., Modipa FS700, FS710, FS720, FS730 and FS770 which are manufactured by Nippon Oils & Fats Co., Ltd., Saimack US-270, US-350, US-352, US-380, US-413, US-450, Rezata GP-705, GS-30, GF-150 and GF-300 which are manufactured by Toa Gosei Chemical Industry Co., Ltd., SH997, SR2114, SH2104, SR2115, SR2202, DCI-2577, SR2317, SE4001U, SRX625B, SRX643, SRX439U, SRX488U, SH804, SH840, SR2107 and SR2115 which are manufactured by Toray Dow Corning Silicone Co., Ltd., and YR3370, TSR1122, TSR102, TSR108, TSR116, TSR117, TSR125A, TSR127B, TSR144, TSR180, TSR187, YR47, YR3187, YR3224, YR3232, YR3270, YR3286, YR3340, YR3365, TEX152, TX153, TEX171 and TEX172 which are manufactured by Toshiba Silicone Co., Ltd.); reactive silicone compositions such as addition reaction type silicone compositions, peroxide curing type and ultraviolet curing type (commercially available reactive silicone compounds include, but not limited to, TSR1500, TSR1510, TSR1511, TSRI515, TSR1520, YR3286, YR3340, PSA6574, TPR6500, TPR6501, TPR6600, TPR6702, TPR6604, TPR6701, TPR6705, TPR6707, TPR6708, TPR6710, TPR6712, TPR6721, TPR6722, UV9315, UV9425, UV9430, XS56-A2775, XS56-A2982, XS56-A3075, XS56-A3969, XS56-A5730, XS56-A8012, XS56-B1794, SL6100, SM3000, SM3030, SM3200 and YSR3022 which are manufactured by Toshiba Silicone Co., Ltd.).

Preferred examples of fluorine compounds include, but not limited to, fluorine oil (commercially available fluorine oil include, but not limited to, Dyfloyl #1, #3, #10, #0, #50, #100, Unidyn TG-440, TG-440, TG-452, TG-490, TG-560, TG-561, TG-590, TG-652, TG-670U, TG-991, TG-999, TG-3010, TG-3020 and TG-3510 which are manufactured by Daikin Kogyo Co., Ltd., MF-100, MF-110, MF-120, MF-130, MF-160 and MF-160E which are manufactured by Tokem Products Co., Ltd., Surflon S-111, S-112, S-113, S-121, S-131, S-132, S-141 and S-145 which are manufactured by Asahi Glass Co., Ltd., and FC-430 and FC431 which are manufactured by Mitsui Phluoro Chemicals Co., Ltd.); fluorine rubber (commercially available fluorine rubber include, but not limited to, LS63U manufactured by Toray Dow Corning Silicone Co., Ltd.; fluorine-modified resin (commercially available fluorine-modified resin include, but not limited to, Modipa F200, F220, F600, F2020 and F3035 which are manufactured by Nippon Oils & Fats Co., Ltd., Dialoma FF203 and FF204 which are manufactured by Dainichiseika Color & Chemicals Mfg. Co., Ltd., Surflon S-381, S-383, S-393, SC-101, SC-105, KH-40 and SA-100 which are manufactured by Asahi Glass Co., Ltd., and EF-351, EF-352, EF-801, EF-802, EF-601, TFE, TFEMA and PDFOH which are manufactured by Tokem Products Co., Ltd., THV-200P manufactured by Sumitomo 3M Ltd.); fluorosulfonate compounds (commercially available examples of fluorosulfonate compound include, but not limited to, EF-101, EF-102, EF-103, EF-104, EF-105, EF-112, EF-121, EF122A, EF122B, EF-122C, EF-123A, EF-123B, EF-125M, EF-132, EF-135M, EF-305, FBSA, KFBS and LFBS which are manufactured by Tokem Products Co., Ltd.); fluorosulfonic acid; fluoride compounds (e.g. anhydrous fluoric acid, dilute fluoric acid, fluorobolic acid, zinc fluorobolite, nickel fluorobolate, tin fluorobolite, lead fluorobolite, cupric fluorobolate, hydrofluosilicic asid, potassium titanate fluoride, perfluoro caprylic acid, perfluoro ammonium octanate, etc.); and inorganic fluoride (e.g. aluminium floride, potassium silicofluoride, potassium zirconate fluoride, zinc fluoride tetrahydrate, potassium fluoride, lithium fluoride, barium fluoride, tin fluoride, potassium fluoride, acidic potassium fluoride, magnesium fluoride, titanic fluorid, ammonium phosphate hexafluoride, potassium phosphate hexafluoride, etc.).

Preferred examples of wax includes, but not limited to, paraffin, synthetic hydrocarbons, modified wax, hydrowax, natural wax, etc.

Preferred examples of commercially available paraffin wax include, but not limited to, Paraffin Wax 155, 150, 140, 135, 130, 125, 120, 115, NHP-3, NHP-5, NHP-9, NHP-10, NHP-11, NHP-12, NHP-15G, SP-0160, SP-0145, SP-1040, SP-1035, SP-3040, SP-3035, NPS-8070, NPS-L-70, OX-2151, OX2251, EMUSTAR-0384 and EMUSTAR-0136 which are manufactured by Nippon Seiro Co., Ltd.; Serozole 686, 651-A, A, H-803, B-460, E-172, 866, K-133, Hidrin D-337 and E-139 which are manufactured by Chukyo Oils & Fats Co., Ltd.; and 125° Paraffin, 125° FP, 130° Paraffin, 135° Paraffin, 135° H, 140° Paraffin, 140° N, 145° Paraffin and Paraffin Wax M which are manufactured by Nisseki Mitsubishi Oil Co., Ltd.; microcrystalline wax such as Hi-Mic-2095, Hi-Mic-3090, Hi-Mic-1080, Hi-Mic-1070, Hi-Mic-2065, Hi-Mic-1045, Hi-Mic-2045, EMUSTAR-0001 and EMUSTAR-042×which are manufactured by Nippon Seiro Co., Ltd., Serozole 967 and M which are manufactured by Chukyo Oils & Fats Co., Ltd., 155 Microwax and 180 Microwax which are manufactured by Nisseki Mitsubishi Oil Co., Ltd.; and petrolatum such as OX-1749, OX-0450, OX-0650B, OX-0153, OX-261BN, OX-0851, OX-0550, OX-0750B, JP-1500, JP-056R and JP-011P which are manufactured by Nippon Seiro Co., Ltd.

Preferred examples of commercially available synthetic hydrocarbon include, but not limited to, polyethylene wax such as Polyron A, 393 and H-481 which are manufactured by Chukyo Oils & Fats Co., and Sunwax E-310, E-330, E-250P, LEL-250, LEL-800 and LEL-400P which are manufactured by Sanyo Chemical Industry Co., Ltd.; polypropylene wax such as Viscol 330-P, 550-P and 660-P which are manufactured by Sanyo Chemical Industry Co., Ltd.; Fischer-Tropsch wax such as FT-100 and FT0070 which are manufactured by Nippon Seiro Co., Ltd.; and acid amide compounds or acid imide compounds such as amido stearate, imide phthalic anhydrate, etc. (e.g. Serozole 920, B-495, Himicron G-270, G-110 and Hidrin 757 which are manufactured by Chukyo Oils & Fats Co.).

Preferred examples of modified wax include, but not limited to, amine-modified polypropylene such as QN-7700 manufactured by Sanyo Chemical Industry Co., Ltd., acrylic acid-modified wax; fluorine-modified wax; olefin-modified wax; urethane-modified wax such as NPS-6010 and HAD-5090 which are manufactured by Nippon Seiro Co., Ltd.; and alcohol wax such as NPS-9210, NPS-9215, OX-1949 and XO-020T which are manufactured by Nippon Seiro Co., Ltd.

Preferred examples of hydrowax include, but not limited to, ricinus or castor oil such as Castor Wax manufactured by Ito Oil Manufacturing Co., Ltd.; derivatives of castor oil such as dehydrated castor oil DCO, DCO Z-1, DCO-Z2, castor oil fatty acid CO-FA, ricinoleic acid, dehydrated castor oil fatty acid DCO-FA, dehydrated castor oil fatty acid epoxyester D-4 ester, castor oil urethane acrylate CA-10, CA-20, CA-30, derivatives of castor oil MINERASOL S-74, S-80, S-203, S-42X, RC-17, RC-55, RC-335, special castor oil condensed fatty acid MINERASOL RC-2, RC-17, RC-55, RC-335, special castor oil condensed fatty acid ester MINERASOL LB-601, LB-603, LB-604, LB-7-2, LB-7-3, #11 and L164 which are manufactured by Ito Oil Manufacturing Co., Ltd.; stearic acid such as 12-hydroxystearic acid manufactured by Ito Oil Manufacturing Co., Ltd.; lauric acid; myristic acid; palmitic acid; behenic acid; sebacic acid such as manufactured by Ito Oil Manufacturing Co., Ltd.; undecylenic acid such as manufactured by Ito Oil Manufacturing Co., Ltd.; heptyl acid such as manufactured by Ito Oil Manufacturing Co., Ltd.; maleic acid; higher maleic oil such as HIMALEIN DC-15, LN-10, OO-15, DF-20 and SF-20 which are manufactured by Ito Oil Manufacturing Co., Ltd.; blown oil such as Serbonol #10, #30, #60, R-40 and S-7 which are manufactured by Ito Oil Manufacturing Co., Ltd.; and cyclopentadiene oil such as CP Oil and CP Oil-S which are manufactured by Ito Oil Manufacturing Co., Ltd.

Preferred examples of natural wax include, but not limited to, vegetable wax, animal wax and mineral wax. Desirable one of these natural wax is of vegetable origin. In light of compatibility in the case where an aqueous thermoplastic resin is used for the toner image receiving layer 2, it is more desirable to employ water-dispersible natural wax.

Preferred examples of vegetable wax include, but not limited to, carnauba wax such as EMUSTAR-0413 manufactured by Ito Oil Manufacturing Co., Ltd. and Serozole 524 manufactured by Chukyo Oils & Fats Co., Ltd., castor oils such as manufactured by Ito Oil Manufacturing Co., colza oils; soybean oils, sumac wax, cotton wax, rice wax, sugarcane wax, canderyla wax, Japan wax and jojoba oils, Animal wax such as bees wax, lanolin, spermaceti, blubber oil and wool wax are also employable. The carnauba wax, that has a melting temperature range of from 70 to 95° C., is especially preferred to be selected among them in terms of preeminence in offset resistance, adhesion resistance, pass-though capability, feeling of glossiness, toughness against cracks as well as from the viewpoint that the electrophotographic image receiving sheet capable of forming a high quality image.

Preferred examples of mineral wax include, but not limited to, natural wax such as montan wax, montan ester wax, ozokerite, ceresin wax, etc.; fatty acid ester such as Sensosizer DOA, AN-800, DINA, DIDA, DOZ, DOS, TOTM, TITM, E-PS, nE-PS, E-PO, E-4030, E-6000, E-2000H, E-9000H, TCP and C-1100 which are commercially available manufactured by Chukyo Oils & Fats Co., Ltd.; synthetic hydrocarbons including polyethylene wax such as Polyron A, 393 and H-481 which are manufactured by Chukyo Oils & Fats Co., Ltd., and Sunwax E-310, E-330, E-250P, LEL-250, LEL-800 and LEL-400P which are manufactured by Sanyo Chemical Industry Co., Ltd.; and polypropylene wax such as Viscol 330-P, 550-P and 660-P which are manufactured by Sanyo Chemical Industry Co., Ltd. The montan wax, that has a melting temperature ranging from 70 to 95° C., is especially preferred to be selected among them in terms of preeminence in offset resistance, adhesion resistance, pass-though capability, feeling of glossiness, toughness against cracks as well as from the viewpoint that the electrophotographic image receiving sheet 1 is capable of forming a high quality image.

The natural wax content of the toner image receiving layer 2 is preferred to range desirably from 0.1 to 4 $g/m^2$ and more desirably from 0.2 to 2 $g/m^2$. If the natural wax content exceeds 0.1 $g/m^2$, significant deterioration of, in particular, offset resistance and adhesion resistance will occur. On the other hand, if the natural wax content exceeds 4 $g/m^2$, the amount of wax is too much to provide the image receiving sheet with a high image quality. The individual natural wax is preferred to have a melting temperature desirably between 70 and 95° C. and more desirably between 75 and 90° C.

Preferred examples of matt agent include, but not limited to, inorganic and organic matt agents in the form of solid particle. The inorganic matt agents include oxides such as silicon dioxide, titanium oxide, magnesium oxide, aluminum oxide, etc.; alkaline earth metallic salts such as barium sulfate, calcium carbonate, magnesium sulfate, etc.; and silver halide such as silver chloride, silver bromide, etc. Specifically, there are a number of available organic matt agents such as described in West Germany Patent No. 2529321, British Patent Nos. 760775 and 1260772, and U.S. Pat. Nos. 1,201,905, 2,192,241, 3,053,662, 3,062,649, 3,257,206, 3,322,555, 3,353,958, 3,370,951, 3,411,907, 3,437,484, 3,523,022, 3,615,554, 3,635,714, 3,769,020, 4,021,245 and 4,029,504.

Preferred examples of material for the matt agent include, but not limited to, starch, cellulose ester (e.g. cellulose acetate propionate), cellulose ether (e.g. ethyl cellulose), and synthetic resins. The synthetic resin is preferred to be of water-insoluble or of water-insoluble. Such the synthetic resins include, but not limited to, polyacrylic or methacrylic ester (e.g. polyalkyl acrylate, polyalkyl methacrylate, polyalkoxyalkyl or methalkoxyalkyl acrylate, polyglycidyl or methaglycidyl acrylate), polyacrylamide, methacrylamide, polyvinyl ester (e.g. polyvinyl acetate), polyacrylonitrile, polyolefin (e.g. polyethylene), polystyrene, benzoguanamine resin, formaldehyde condensed polymer, epoxy resin, polyamide, polycarbonate, phenol resin, polyvinyl carbazole, and polyvinyliden chloride. Polymers comprising monomers used for the above mentioned polymers can be utilized.

In the case of utilizing the copolymer, the polymer may contain a hydrophilic monomer unit in small quantity. Otherwise, the copolymer may be one of a random polymer, a block polymer and a graft polymer each of which contains a hydrophilic monomer. Preferred examples of monomer forming a hydrophilic repeating unit include, but not limited to, acrylic acid, methacrylic acid, α-, β-unsaturated carboxylic acid, hydroxy alkyl acrylate, hydroxy alkyl methacrylate, sulfoalkyl acrylate, sulfoalkyl methacrylate, and styrene sulfonate.

Specifically, there are a number of available organic matt agent such as described in British Patent No. 1055713, U.S. Pat. Nos. 1,939,213, 2,221,873, 2,268,662, 2,322,037, 2,376,005, 2,391,181, 2,701,245, 2,992,101, 3,079,257, 3,262,782, 3,443,946, 3,516,832, 3,539,344, 3,591,397, 3,754,924 and 3,767,448, and Japanese Unexamined Patent Publication Nos. 49-106821 and 57-14835. These solid particles may be used individually or in any combination of two or more. The average particle size is preferred to be in a range of desirably from 1 to 100 μm and more desirably from 4 to 30 μm. The amount of used solid particles is properly in a range of from 0.01 to 0.5 $g/cm^2$, and more properly in a range of from 0.02 to 0.3 $g/cm^2$.

The release agent that added to the toner image receiving layer may be derivatives, compounds, refined products or mixtures of the above mentioned materials. In addition, the release agent is preferred to be of water-soluble in light of compatibility in the case where an aqueous thermoplastic resin is used for the toner image receiving layer 2. It is preferred for the toner image receiving layer 2 to have a release agent content desirably a in a range of desirably from 0.1 to and 10 weight %, more desirably from 0.3 to 8.0 weight %, and most desirably from 0.5 to 5.0 weight %.

Other Component Materials

Various other component materials may be added into the toner image receiving layer 2 for the purpose of improving thermodynamic properties of the toner image receiving layer 2. Preferred examples of additional component material include, but not limited to, a coloring agent, a plasticizing agent, a filler, a crosslinking agent, an antistatic control agent, an emulsifying agent, a dispersing agent, etc. The component material is preferred to be of hollow particle in light of predominant thermal conductivity (low thermal conductivity) of the toner image receiving layer 2 during toner image fixation.

Coloring Agent

Coloring agents include fluorescent brightening agents, white pigment, colored pigment, dye, etc.

The fluorescent brightening agent is a compound having absorptive power in the near-ultraviolet range and a fluorescent range of from 400 to 500 nm. The conventional fluorescent coloring agents can be used without being particularly bounded by type. Preferred examples of fluorescent brightening agent include, but not limited to, compounds disclosed in "The Chemistry of Synthetic Dyes" edited by K. VeenRatarman, Vol. 8, Chapter 8. Specifically, the compounds include stilbene compounds, coumarin compounds, biphenyl compounds, benzooxazoline compounds, naphthalimide compounds, pylazorine compounds, carbostyryl compounds, etc. Preferred examples of comercially available fluorescent brightening agent include, but not limited to, White Fulfa PSN, PHR, HCS, PCS and B which are manufactured by Sumitomo Chemical Co., Ltd., and UVITEX-OB manufactured by Chiba-Geigy Ltd.

White pigment include, but not limited to, titanium oxides, calcium carbonate, etc., and other inorganic pigment which will be described in connection with fillers later.

Preferred examples of colored pigment include, but not limited to, various pigments and azoic pigment disclosed in, for example, Japanese Unexamined Patent Publication No. 63-44653 such as azolake pigment (e.g. carmine 6B, red 2B), insoluble azo pigment (e.g. monoazo yellow, disazo yellow, pyrazolo orange and Balkan (Vulcan) orange), condensed azo pigment (e.g. chromophthal yellow and chromophthal red); polycyclic pigment (e.g. copper phthalocyanine blue and copper phthalocyanine green), dioxazine polycyclic pigment (e.g. dioxazine violet), indolynone polycyclic pigment (e.g. indolynone yellow), slen polycyclic pigment (perylene, perynon, flavantron, thioindigo); lake pigment (e.g. malachite green, rhodamine B, rhodamine G and Victoria blue B); and inorganic pigment such as oxides, titanium dioxide, colcothar, sulfate (e.g. precipitable barium sulfate), carbonate (precipitable calcium carbonate), silicate (e.g. hydrated silicate and anhydrous silicate), metal powder (e.g. aluminum powder, bronze powder, blue powder), carbon black, chrome yellow, iron blue, etc.

These white pigments may be used individually or in any combination of two or more. The titanium oxide is the most preferable pigment among them.

The pigment is not particularly bound by shape and is, however, desirable to comprise hollow particles in light of predominant thermal conductivity (low thermal conductivity) during toner image fixation.

Various dyes that are used as the coloring agent include oil-soluble dyes such as anthraquinone compounds and azo copounds.

Specifically, preferred examples of dye include, but not limited to, vat dyes such as C.I.Vat violet 1, C.I.Vat violet 2, C.I.Vat violet 9, C.I.Vat violet 13, C.I.Vat violet 21, C.I.Vat blue 1, C.I.Vat blue 3, C.I.Vat blue 4, C.I.Vat blue 6, C.I.Vat blue 14, C.I.Vat blue 20, C.I.Vat blue 35, disperse dyes such as C.I. Disperse violet 1, C.I. Disperse violet 4, C.I. Disperse violet 10, C.I. Disperse blue 3, C.I. Disperse blue 7, C.I. Disperse blue 58, and oil-soluble dye such as C.I. Solvent violet 13, C.I. Solvent violet 14, C.I. Solvent violet 21, C.I. Solvent violet 27, C.I. Solvent blue 11, C.I. Solvent blue 12, C.I. Solvent blue 25, C.I. Solvent blue 55. Colored coupler used for silver photography can be preferably used.

It is preferred for the toner image receiving layer 2 to have a coloring agent in a range of desirably from 0.1 to 8 $g/cm^2$, and more desirably from 0.5 to 5 $g/cm^2$. If the coloring agent content is less than the lower limit of 0.1 $g/cm^2$, the toner image receiving layer 2 has an increased light transmittance. On the other hand, if the coloring agent content is beyond the upper limit of 8 $g/cm^2$, the toner image receiving layer 2 is apt to become poor in tractability or looses adhesion resistance and/or toughness against cracks.

Plastisizing Agent

Various conventional plasticizing agents for resin can be used without any particular restrictions. The plasticizing agent has the function of controlling drift or softening or melting of the toner image layer 2 due to heat and/or pressure applied in the toner fixation process. The plasticizing agent can be selected consulting "Handbook Of Chemistry" by Chemical Society of Japan published by Maruzen, "Plasticizer—Theory and Applications—" by Kouichi Murai published by Koushobou), "Study On Plasticizer Vol. 1" and "Study On Plasticizer Vol. 2" both by Polymer Chemistry Association, "Handbook Rubber•Plastics Compounding Chemicals" by Rubber Digest Ltd., etc.

Available plasticizing agents are, on one hand, cited as high boiling point organic solvent or heat solvent and, on the other, exemplified in, for example, Japanese Unexamined Patent Publication Nos. 59-83154, 59-178451, 59-178453, 59-178454, 59-178455, 59-178457, 62-174745, 62-245253, 61-09444, 61-2000538, 62-8145, 62-9348, 62-30247, 62-136646, and 2-235694. Examples of plasticizer agent disclosed in these publications include ester such as phthalate ester, phosphate ester, fatty ester, abietate, adipate, sebacate, azelate, benzoate, butyrate, epoxidized fatty ester, glycolate, propionate, trimellitate, citrate, sulfonate, calboxylate, succinate, maleate, phthalate, stearate; amide such as fatty amide, sulfoamide; ether; alcohol; lactone; and polyethyleneoxy.

In the case of using polymers for the plasticizing agent, the polymer is preferred to have a molecular weight desirably less than a binder resin that is to be plasticized. Specifically, the molecular weight of the plasticizing agent is desirably less than 1000 and more desirably less than 5000. In the case of using a polymer for the plasticizing agent, the polymer is preferred to be the same in type as a binder resin that is to be plasticized. For example, when plasticizing polyester resin, it is preferred to use a polyester having a low molecular weight. Also, oligomer can be used for the plasticizing agent.

Preferred examples of commercially available plastiizing agent other than the aforementioned compounds include, but not limited to, Adecasizer PN-170 and PN-1430 which are manufactured by Asahi Denka Kogyo K.K., PARAPLEX-G-25, G-30 and G-40 which are manufactured by HALL Corporation, Estergum 8L-JA, Ester R-95, Pentaryn 4851, FK115, FK4820, FK830, Ruizol 28-JA, Picorastic A75, Picotex LC and Crystalex 3085 which are manufactured by Rika Hercules Co., Ltd.

It is possible to make arbitrary use of the plasticizing agent in order to reduce stress or strain (physical strain due to elastic force and/or viscosity or strain due to mass balance of molecules, main chains and pendants) that occurs when toner particles are buried in the toner image receiving layer 2. The plasticizing agent may be present in the toner image receiving layer 2 in a microscopically dispersed state, a phase separated domain in micrometer size (like sea-island morphology) or a state where the plasticizing agent has mixed with and dissolved in other components such as a binder sufficiently.

The toner image receiving layer 2 is preferred to have a plasticizing agent content in a range of desirably from 0.001 to 90 weight %, more desirably from 0.1 to 60 weight %, and most desirably from 1 to 40 weight %.

The plasticizing agent may be utilized for the purpose of optimizing competence to slip (improved sliding mobility due to a reduction of frictional force), offset of a fixing area (separation of a toner layer to the fixing area), curling balance and static antistatic (build-up of electrostatic toner image) of the electrophotographic image receiving sheet 1.

Filler

Organic fillers and inorganic fillers or pigment such as those known as stiffeners, fillers and reinforcing agents for binder resins can be used.

The filler can be selected consulting "Handbook Rubber•Plastics Compounding Chemicals" by Rubber Digest Ltd., etc., "New Edition Plastic Compounding Agent Basics And Applications" by Taiseisha, "Filler Handbook" by Taiseisha, etc.

Available inorganic pigment include, but not limited to, silica, alumina, titanium dioxide, zinc oxide, zirconia, iron oxide like mica, zinc white, lead oxide, cobalt oxide, strontium chromate, molybdenum pigment, smectite, magnesium oxide, calcium oxide, calcium carbonate, mullite. Silica or alumina is particularly preferable as the filler. These pigment may be used individually or in combination of two or more. The filler desirably comprises fine particles. If the size of particle is large, the toner image receiving layer 2 is apt to have a roughed surface.

There are two available types of silica, i.e. globular silica and amorphous silica. These silica can be synthesized in either a wet process or a dry process, or otherwise an aerogel process. Hydrophobic silica particles may be treated with a trimethylsilyl group or silicon. In this case, colloidal particles of silica is favorably used. The silica is preferred to have an average particle size in a range of from 200 to 5000 nm.

The silica particle is also preferred to be porous. The porous silica particle is preferred to have an average particle size in a range of desirably from 4 to 120 nm, and more desirably from 4 to 90 nm and an average pour volume per unit mass in a range of from 0.5 to 3 ml/g.

There are two available types of alumina, i.e. anhydrous alumina and alumina hydrate. The anhydrous alumina may be of a crystal form of α, β, γ, δ, ζ, η, θ, κ, ρ or χ. The anhydrous alumina is desirably used rather than the alumina hydrate. Monohydrate includes pseudoboemite, boemite and diaspore. Trihydrate includes gibbsite and bayerite. The alumina particle is preferred to have an average particle size in a range of desirably from 4 to 300 nm, and more desirably from 4 to 200 nm. The alumina particle is also preferred to be porous. The porous alumina particle is preferred to have an average particle size in a range of desirably from 50 to 500 nm and an average pour volume per unit mass in a range of desirably from 0.3 to 3 ml/g.

The alumina hydrate can be synthesized in either a sol-gel process in which alumina is precipitated by adding ammonia in a solution of alminium or a process of hydrolyzing an aluminate alkali. The anhydrous alumina can be derived by heating alumina hydrate for dehydration.

The filler content is in a range of desirably from 5 to 2000 weight % with respect to a dry mass of a binder of a layer to which the filler is added.

Crosslinking Agent

The crosslinking agent is blended for providing the toner image receiving layer 2 with storage stability and controlling thermoplasticity of the toner image receiving layer 2. Compounds used for this type of crosslinking agent are those that have more than two reactive groups, such as an epoxy group, an isocyanate group, an aldehydo group, an active halogen group, an active methylene group, acetylene group and others well known to those skilled in the art, in a molecule. Otherwise, it is effective to use compounds that have more than two groups capable of forming a bond through ionic bonding, hydrogen bonding, coordinate bonding, etc.

Crosslinking agents include, but not limited to, compositions well known as a coupling agent, a hardening agent, a polymerization initiator, a polymerization promoter, a coagulating agent, a film forming agent, a film forming auxiliary agent, etc. for resins. Preferred examples of coupling agent include, but not limited to, chlorosilane, vinylsilane, epoxysilane, aminosilane, alkoxy aluminum chelate, titanate coupling agent, and those disclosed in "Handbook Rubber•Plastics Compounding Chemicals" by Rubber Digest Ltd.

Antistatic Control Agent

The toner image receiving layer 2 is preferred to contain an antistatic control agent for controlling transfer and adhesion of toner and preventing the toner image receiving layer 2 from antistatic and adhesion. Examples of conventionally well known antistatic control agent include, but not limited to, surface active agents such as a cation surface active agent, an anion surface active agent, an amphoteric surface active agent or a nonionic surface active agent, polyelectrlyte and conducting metal oxides. Specific examples of antistatic control agent include, but not limited to, cation antistatic agents such as quaternary anmonium salts, polyamine derivatives, cation-modified polymethyl methacrylate or cation-modified polystyrene, anion antistatic agents such as alkylphosphate or anion polymers, and nonionic antistatic agents such as fatty ester or polyethylene oxides. In the case where toner is charged with negative electricity, the cation antistatic agent or the nonion antistatic agent is preferred for the antistatic control agent which the toner image receiving layer 2 is blended with.

Preferred examples of conducting metal oxide include, but not limited to, $ZnO$, $TiO_2$, $SnO_2$, $Al_2O_3$, $In_2O_3$, $SiO_2$, $MgO$, $BaO$, $MoO_3$, etc. These conducting metal oxides may be used individually or in the form of complex oxide. The metal oxide may be further doped with a hetero element. For example, $ZnO$ can be doped with Al or In, $TiO_2$ can be doped with Nb or Ta, and $SnO_2$ can be doped with Sb, Nb or halogens.

Other Additives

The toner image receiving layer 2 may contain various other additives on order to have improved image forming stability and stability of its own optical and physical characteristics. Additives for achieving the purpose include an anti-oxidizing agent, an anti-aging agent, an anti-deterioration agent, an antiozonant, an ultraviolet absorbing agent, a metal complex, a photostabilizer, an antiseptic agent, a mildewproofing agent, etc.

Preferred examples of anti-oxidizing agent include, but not limited to, chroman compositions, coumarone compounds, phenol compounds (e.g. hindered phenol), hydroquinone derivatives, hindered amine derivatives, spiroindan compounds, and, in addition, those disclose in Japanese Unexamined Patent Publication No. 61-159644.

The anti-aging agent can be selected consulting "Handbook Rubber•Plastics Compounding Chemicals—$2^{nd}$ Edition" (published 1993 by Rubber Digest Ltd.), pages 76 through 121.

Preferred examples of ultraviolet absorbing agent include, but not limited to, benzotriazole disclosed in U.S. Pat. No. 3,533,794, 4-thiazolidone compounds disclosed in Japanese Unexamined Patent Publication No. 46-2784 and ultraviolet absorbing polymers disclosed in Japanese Unexamined Patent Publication No. 62-260152. Preferred examples of metal complex include, but not limited to, those disclosed in U.S. Pat. Nos. 4,241,155, 4,245,018 and 4,254,195, Japanese Unexamined Paten Publication Nos. 61-88256, 62-174741, 63-199248, 1-75568 and 1-74272. The metal complex can be selected from ultraviolet absorbing agents and photostabilizers disclosed in "Handbook Rubber•Plastics Compounding Chemicals—$2^{nd}$ Edition", pages 76 through 121 (published 1993 by Rubber Digest Ltd.). Materials that can be used for the toner image receiving layer 2 are additives well known in the conventional photographic art. For example, various additives are disclosed in Research Disclosure Magazine (RD) Nos. 17643 (December 1987), 18716 (November 1979) and 307105 (November 1989). These additives appear on the following pages:

| Additive | RD17643 | RD18716 | RD307105 |
|---|---|---|---|
| Brightener | 24 | 648R | 868 |
| Stabilizer | 24–25 | 649R | 868–870 |
| Light Absorbent (UV Absorbent) | 25–26 | 649R | 873 |
| Color Image Stabilizer | 25 | 650R | 872 |
| Film Hardener | 26 | 651L | 874–875 |
| Binder | 26 | 651L | 873–874 |
| Plasticizer/Lubricant | 27 | 650R | 876 |
| Coating Auxiliary (Surface Active Agent) | 26–27 | 650R | 875–876 |
| Antistatic Agent | 27 | 650R | 976–977 |
| Matt Agent | | | 878–879 |

The toner image receiving layer 2 is formed by applying a coating liquid containing a polymer over the support 3 by the use of a wire coater and drying it. The coating liquid is prepared by dissolving or uniformly dispersing additives, e.g. a thermoplastic polymer and a plasticizing agent, in an organic solvent such as alcohol or ketone. Preferred examples of organic solvent include, but not limited to, methanol, isopropyl alcohol and methyl ethyl ketone. In the case of using a water-soluble polymer for the toner image receiving layer 2, the toner image receiving layer 2 can be formed by applying a aqueous solution of the polymer over the support 3. In the case of using a water-insoluble polymer, the toner image receiving layer 2 can be formed by applying a water-dispersed solution of the polymer over the support 3.

The polymer layer is preferably formed at a coating temperature higher than an ambient temperature for storage before printing and lower than 100° C. for toner fixation.

The toner image receiving layer 2 is applied so as to have a dry weight in a range of desirably from 1 to 20 g/m$^2$ and more desirably from 4 to 15 g/m$^2$ and a thickness in a range of desirably from 1 to 30 $\mu$m, and more desirably from 2 to 20 $\mu$m.

<Solid State Properties of Electrophotogaphic Image Receiving Sheet>

The following description will be directed to solid state properties of the electrophotogaphic image receiving sheet 1. As known, it can be assessed by measuring surface free energy or contact angles of a surface of the toner image receiving layer 2 before and after heating and cooling whether a release agent dispersed in the toner image receiving layer 2 transfers onto the surface due to melting by heat and forms a layer or film of the release agent on the surface.

Surface Free Energy of Toner Image Receiving Layer

When a difference in polar component between surface free energy of the surface of the toner image receiving layer before heating and that after heating and cooling is great, the release agent can transfer onto the surface of the toner image receiving layer according to the difference. This fact demonstrates that a layer of the release agent is formed on the surface. This is because what can play a role in adhering two materials and separating one from the other is surface free energy of the materials, in particular their polar component. In general, it can be said that the smaller the surface free energy of a material becomes, the less adhered the material is.

Specifically, letting $\gamma sp^0$[mJ/m$^2$] and $\gamma sp^1$[mJ/m$^2$] be the value of a polar component of surface free energy of the toner image receiving layer before heating the photoelectric image receiving sheet and the value of a polar component of surface free energy of the toner image receiving layer after having heated the photoelectric image receiving sheet to 120° C. and then cooled it to 25° C., respectively, the following condition is satisfied:

$$\gamma sp^0 - \gamma sp^1 \geqq 2.5 \text{ [mJ/m}^2\text{]}$$

The difference in surface free energy is appropriate to be equal to or greater than 3 [mJ/m$^2$].

In this instance, the value of a polar component of surface free energy ($\gamma$sp) can be obtained on the basis of contact angles ($\theta_i$ and $\theta_j$) of the surface of the toner image receiving layer and a fixing belt with respect to liquids i and j using the following Fowks' formula:

$$\gamma_{sp} = \frac{\begin{vmatrix} \sqrt{\gamma_{li}^d}\,\frac{\gamma_{li}}{2} & (1+\cos\theta_i) \\ \sqrt{\gamma_{lj}^d}\,\frac{\gamma_{lj}}{2} & (1+\cos\theta_j) \end{vmatrix}^2}{\begin{vmatrix} \sqrt{\gamma_{li}^d} & \sqrt{\gamma_{li}^p} \\ \sqrt{\gamma_{lj}^d} & \sqrt{\gamma_{lj}^p} \end{vmatrix}^2}$$

wherein $\gamma_{li}$ and $\gamma_{lj}$ represent tension inherent in the liquids i and j, respectively;

$\gamma^d_{li}$ and $\gamma^d_{lj}$ represent components of dispersion force of the surface tension inherent in the liquids i and j, respectively;

$\gamma^P_{li}$ and $\gamma^P_{lj}$ represent polar components of the surface tension inherent in the liquids i and j, respectively;

$\theta_i$ and $\theta_j$ represent contact angles of the liquids i and j, respectively.

Contact Angle at Toner Image Receiving Layer

When a difference between a contact angle of water with respect to the surface of the toner image receiving layer before heating and that after heating and cooling is great, the release agent can transfer onto the surface of the toner image receiving layer according to the difference.

Specifically, letting $\theta^0$[°] and $\theta^1$ [°] be the contact angle of water with respect to the surface of the toner image receiving layer before heating the photoelectric image receiving sheet and having heated the photoelectric image receiving sheet to 120° C. and then cooled it to 25° C., respectively, the following expression is satisfied:

$$\theta^1 - \theta^0 \geqq 5[°]$$

The difference in contact angle is appropriate to be equal to or greater than 8[°].

The contact angle of water can be estimated by a sessile drop method, e.g. by the use of a contact angle gauge manufactured by Kyowa interface Science Co., Ltd.

<Solid State Properties of Image Receiving Layer>

The toner image receiving layer is preferred to be high in the degree of whiteness. Specifically, the toner image receiving layer is preferred to have a degree of whiteness estimated by the measuring method meeting JIS 8123 higher than 85%. The toner image receiving layer is also preferred to have spectral reflectance higher than 85% and a difference between the highest and the lowest spectral reflectance less than 5% desirably in a wavelength range of from 440 to 640 nm and spectral reflectance higher than 85% and more desirably in a wavelength range of from 400 to 700 nm.

When specifying the degree of whiteness by means of CIE 1976 L*a*b* color space, the toner image receiving layer is preferred to have an L* value desirably greater than 80, more desirably greater than 85 and most desirably greater than 90.

The while color is desirable to be as neutral as possible and, in other words, has a value $((a^*)^2+(b^*)^2)$ expressed in CIE 1976 L*a*b* color space desirably less than 50, more desirably less than 18 and most desirably less than 5.

The toner image receiving layer is preferred to have a higher degree of glossiness. Specifically, the degree of 45° glossiness is preferably greater than 60, more desirably greater than 75, and most desirably greater than 90. However, the highest degree of 45° glossiness is desirably less than 110 in a range of from a white state where toner is absent to a black state having the highest density of toner. If the degree of degree of 45° glossiness is beyond 90, the toner image receiving layer forms an image with a gloss like metallic luster which is undesirable. The degree of glossiness can be estimated by the measuring method meeting JIS Z8741.

The toner image receiving layer is preferred to have a higher degree of smoothness. Specifically, the degree of smoothness expressed by arithmetic averages roughness (Ra) is desirably less than 3 $\mu$m, more desirably less than 1 $\mu$m, and most desirably less than 0.5 $\mu$m. The arithmetic averages roughness (Ra) can be estimated by the measuring method meeting JIS B0601, B0651 and B0652.

The toner image receiving layer is preferred to have at least one of the following solid state properties (1) to 8):

(1) The toner image receiving layer has a glass-transition temperature (Tg) that is desirably higher than 30° C., but is not more-than-20° C. higher than a glass-transition temperature of toner;

(2) The toner image receiving layer has a ½ melting temperature (T½) in a range of desirably from 60 to 200° C., and more desirably from 80 to 170° C. In this instance, the ½ melting temperature (T½) is estimated by mans of a temperature for a half of a piston stroke from a start of outpouring of the toner image receiving layer from a cylinder under a specified extrusion load in specified circumstances to a finish of the outpouring when the toner image receiving layer in the cylinder is heated so as to raise its temperature linearly after preheating at 50° C. for 300 seconds.

(3) The toner image receiving layer has a runoff start temperature (Tfb) is desirably not more-than-50° C. higher than a runoff start temperature of toner;

(4) The toner image receiving layer has a temperature at which the toner layer viscosity attains $1\times10^5$ CP higher than 40° C. but which is lower than that of tone;

(5) The toner image receiving layer has a storage elastic modulus (G') at a fixing temperature in a range of from $1\times10^2$ to $1\times10^5$ Pa and a loss elastic modulus (G") at the fixing temperature in a range of from $1\times10^2$ to $1\times10^5$ Pa;

(6) The toner image receiving layer has a loss tangent (G"/G') at the fixing temperature, which represents a ration of loss elastic modulus (G") at the fixing temperature to storage elastic modulus (G') at the fixing temperature, in a range of from 0.01 to 10;

(7) The toner image receiving layer has a storage elastic modulus (G') at a fixing temperature is in a range of from −50 Pa from a storage elastic modulus (G't) for toner at fixing temperature to +2500 Pa from the storage elastic modulus (G't);

(8) Molten toner has an angle of inclination with respect to the toner image receiving layer desirably less than 50°, and more desirably less than 4°.

The toner image receiving layer that satisfies the solid state properties disclosed in U.S. Pat. No. 2,788,358 and Japanese Unexamined Patent publication Nos. 7-248637, 8-305067 and 10-239889 is preferred.

The aforementioned solid state property (1) can be estimated using a measuring device well known as a differential scanning calorimeter (DSC) in the art. The aforementioned solid state properties (2) and (3) can be estimated using a measuring device such as Flow Tester CFT-500 or CFT-500D manufactured by Shimazu Corporation. The aforementioned solid state properties (5) to (7) can be estimated using a rotational rheometer such as Dynamic Analyzer RADII manufactured by Scientific Co., Ltd. Further, the aforementioned solid state property (8) can be estimated by a method disclosed in, for example, Japanese Unexamined Patent publication No. 8-334916, using a contact angle measuring device such as manufactured by Kyowa Surface Chemistry Co., Ltd.

The toner image receiving layer has a surface electrical resistivity in a range of desirably from $1\times10^6$ to $1\times10^{15}$ $\Omega/cm^2$ under conditions of a temperature of 25° C. and a relative humidity of 65%. If the lower limit electrical resistivity of $1\times10^6$ $\Omega/cm^2$ is exceeded, this indicates that the amount of toner transferred to the toner image receiving layer is insufficient, then a toner image is apt to diminish in density. On the other hand, if the upper limit electrical resistivity of $1\times10^{15}$ $\Omega/cm^2$ is exceeded, electrical charges are generated more than necessary during transferring toner. This excessive electrical charge generation causes insufficient transfer of toner, resulting in a low density of toner image, presence of dust due to electrical charges during handring the elctrophotographic image receiving sheet, misfeed of the eletrophotographic image receiving sheet, multiple feed of two or more sheets, generation of charge prints and an occurrence of fractional absence of toner transfer. The toner image receiving layer at one side opposite to the support is preferred to have a surface electrical resistivity in a range of desirably from $5\times10^8$ to $3.2\times10^{10}$ $\Omega/cm^2$, and more desirably from $1\times10^9$ to $1\times10^{10}$ $\Omega/cm^2$. The surface electrical resistivity can be estimated in conformity with JIS K 6911 using a measuring device such as R8340 manufactured by Advantest Co., Ltd. Specifically, the electrical resistivity is measured one minute after one-minute impression of a voltage of 100V on a sample image receiving layer under a specified environment condition, that is 20° C. and 65% humidity, after leaving it under the same environmental condition for more than 8 hours.

<Other Layers>

As was previously mentioned, the electrophotographic image receiving sheet 1 may be provided with other layers. Examples of layer include a surface protective layer, a backing layer, a contact improvement layer, an intermediate layer, an under coating layer, a cushioning layer, an antistatic control or antistatic layer, a reflection layer, a color control layer, a storage stability improvement layer, an antiadhesion layer, an anticurling layer and a smoothing layer. These layers may be provided individually or in any combination of two or more.

Surface Protection Layer

The surface protective layer is formed over the surface of the toner image receiving layer 2 for the purpose of protecting the surface of the electrophotographic image receiving sheet 1, improving storage stability, easiness of handling and pass-through capability of the electrophotographic image receiving sheet 1, and providing the electrophotographic image receiving sheet 1 with writability and anti-offset resistance. The surface protective layer may be formed double or more. Although various types of thermoplastic resin binder or thermosetting resin binder can be used for the surface protective layer, it is preferred to use the same thermoplastic resin binder or thermosetting resin binder as used for the toner image receiving layer. The binder of the surface protective layer is not always the same in thermo dynamic and electrostatic characteristics as that of the toner image receiving layer and can be optimized so as to meet the surface protective layer.

The surface protective layer may be blended with additives, e.g. a matt agent well known in the art, usable for the toner image receiving layer as well as the release agent described above. The outermost layer of the photoelectric image receiving sheet 1 (the surface protective payer when formed) is preferred to have higher compatibility with toner in light of fixing performance. Specifically, the surface protective layer is preferred to have a contact angle with molten toner in a range of desirably from 0 to 40°.

Backing Layer

The backing layer is preferably formed on a surface of the support 3 of the photoelectric image receiving sheet 1 opposite to the toner image receiving layer 2 for the purpose of providing back side printing suitability, and improving back side printing quality, curling balance and pass-through capability of the electrophotographic image receiving sheet 1. Though the backing layer is not always bound by color, it is preferred white as well as the toner image receiving layer 2 in the case where the photoelectric image receiving sheet 1 is of two-sided. The backing layer is preferred to have a degree of whiteness and a spectral reflectance both higher than 85% like the toner image receiving layer 2. In order to improve two-side printing suitability, the backing layer may consist of a single layer or multiple layers and may be the same in structure as the toner image receiving layer 2. Further, the backing layer may be blended with additives, e.g. a matt agent and an antistatic control agent. In the case of using release oil for the fixing rollers, the backing layer is preferred to be of an oil absorbing type.

Contact Improvement Layer

The electrophotogreaphic image receiving sheet 1 is preferably provided with a contact improvement layer for the purpose of improving contact between the toner image receiving layer 2 and the support 3. The contact improvement layer may be blended with various additives including, in particular, a crosslinking agent, previously described. Further, the electrophotogreaphic image receiving sheet 1 is preferably provided with a cushioning layer for improving toner receptivity between the contact improvement layer and the toner image receiving layer 2.

Intermediate Layer

The electrophotogreaphic image receiving sheet 1 may be provided with an intermittent layer between the support 3 and the contact improvement layer, between the contact improvement layer and the cushioning layer, between the cushioning layer and the toner image receiving layer 2, or between the toner image receiving layer 2 and a storage stability improvement layer. In the case where the electrophotogreaphic image receiving sheet 1 consists of the support 3, the toner image receiving layer 2 and the intermediate layer, it is of course to put the intermediate layer between the support 3, the toner image receiving layer 2.

The electrophotogreaphic image receiving sheet 1 with these additive layers is not bound by thickness and preferred to have a thickness in a rage of desirably from 50 to 350 $\mu$m, and more desirably from 100 to 280 $\mu$m, for the purpose.

Toner

The electrophotogreaphic image receiving sheet 1 receives toner on the toner image receiving layer 2 in printing or copying use. The toner contains at least a binder resin and coloring agent, and additionally a release agent and other component materials if needed.

Toner Binding Resin

Preferred examples of available binding resin include, but not limited to, styrene such as styrene and parachlorosthylene; vinyl ester such as vinyl naphthalene, vinyl chloride, vinyl bromide, vinyl fluoride, vinyl acetate, vinyl propionate, vinyl benzoate and vinyl butarate; ethylene aliphatic carboxylate such as methyl acrylate, ethyl acrylate, n-butyl acrylate, isobutyl acrylate, dodecyl acrylate, n-octyl acrylate, 2-chloroethyl acrylate, phenyl acrylate, methyl α-chloromethyl acrylate, methyl methacrylate, ethyl methacrylate and butyl methacrylate; vinyl nitrile such as acrylonitrile, methcrylonitrile and acrylamide; vinyl ether such as vinyl methyl ether, vinyl ethyl ether and vinyl isobutyl ether; N-vinyl compounds such as N-vinyl pyrrole, N-vinyl carbazole, N-vinyl indole and N-vinyl pyrolidone; homopolymers or copolymers of vinyl monomers such as vinyl carboxylate, e.g. methacrylic acid, acrylic acid or cinnamic acid; polyester; which may be used individually or in combination with wax. It is preferred to use the same type of resin as used for the toner image receiving layer 2

Toner Coloring Agent

Coloring agents that are used for ordinary toner can be used without any restriction. Preferred examples of available coloring agent include, but not limited to, pigments such as carbon black, chrome yellow, Hansa yellow, benzidine yellow, slen yellow, quinoline yellow, permanent orange GTR, pyrazolone orange, Vulcan orange, Watchung red, permanent red, brilliant carmine 3B, brilliant carmine 6B, Deipon oil red, pyrazalone red, redole red, rhodamine B lake, lake red, rose Bengal, aniline blue, ultramarine blue, Carco oil blue, methylene blue chloride, phthalocyanine blue, phthalocyanine green and malachite green oxalate and dyes such as acridine dyes, xanthene dyes, azoic dyes, benzoquinone dyes, axine dyes, anthraquinone dyes, thioindigo dyes, dioxazine dyes, thiazine dyes, azomethine dyes, indigo dyes, thioindigo dyes, phthalocyanine dyes, aniline black dyes, polymethine dyes, triphenylmethane dyes, diphenylmethane dyes, thiazine dyes, thiazole dyes and xanthene dyes. These pigments or dyes may be used individually or in any combination of two or more.

The coloring agent content of toner is preferably in a range of from 2 to 8 weight %. The coloring agent can color the toner without deterioration of coloring strength when the content is higher than the lower limit and prevents the toner from loosing transparency when the content is lower than the upper limit.

Release Agent

Although all of the conventionally known wax can be used as the releasing agent for the toner in principle, preferred examples of release agent include, but not limited to, highly crystalline polyethylene wax with a comparatively low molecular weight, Fischer-Tropsch wax, amide wax and polar wax containing nitrogen such as urethane compounds. The polyethylene wax is preferred to have a molecular weight desirably less than 1000, and more desirably in a range of from 300 to 1000.

The compound having an urethane bond is preferably used because it keeps itself in a solid state due to coagulation power of its polar group even though it has only a small molecular weight and is set to a melting temperature that is high for the small molecular weight. Preferred raw materials for the compound include, but not limited to, a combination of a diisocyanate compound and monoalcohol, a combination of monoisocyanate compound and monoalcohol, a combination of dialcohol and monoisocyanate compound, a combination of trialcohol and monoisocyanate compound, and a combination of triisocyanate compound and monoalcohol. In order to keep the compound from having a higher molecular weight, it is preferred to combine multifunctional and monofunctional compounds and is important for the compound to have quantitatively equivalent functional groups.

Preferred example of monoisocyanate include, but not limited to, dodecyl isocyanate, phenyl isocyanate, derivatives of phenyl isocyanate, naphthyl isocyanate, hexyl isocyanate, benzyl isocyanate, butyl isocyanate and aryl isocyanate. Preferred example of diisocyanate include, but not limited to, tolylene diisocyanate, 4,4' diphenyl methane diisocyanate, toluene diisocyanate, 1,3-phenylene diisocyanate, hexamethylene diisocyanate, 4-methyl-m-phenylene diisocyanate and isophorone diisocyanate.

Preferred example of monoalcohol include, but not limited to, methanol, ethanol, propanol, butanol, pentanol, hexanol and heptanol.

Preferred example of dialcohol include, but not limited to, various glycol such as ethylene glycol, diethylene glycol, triethylene glycol, trimethylene glycol, etc.

Preferred example of trialcohol include, but not limited to, trimethylol propane, triethylol propane, trimethanol ethane, etc.

Each of the compounds may be added to the toner together with a resin and/or a coloring agent like conventional release agents so as to provide a kneaded pulverized toner. When using the compounds for toner prepared by an emulsion-polymerization-coagulation-fusion method, the compound is dispersed in water together with polyelectrolytes such as an ionic surfactant, a acidic polymer and basic polymer, heated to a temperature higher than its melting temperature and sheared to particulates of less than 1 $\mu$m by the use of a homogenizer or a pressure discharge dispersion device. A dispersion liquid of the release agent particulates can be used for the toner together with a dispersion liquid of resin particulates and/or a liquid of coloring agent particulates.

Other Components of Toner

The toner may be blended with other components such as additives, an antistatic control agent, inorganic particulates, etc.

Examples of additive are magnetic materials that include, but not limited to, ferrite, magnetite, reduced iron, cobalt, nickel, manganese, and compounds of them.

Preferred examples of antistatic control agent include, but not limited to, dye such as quaternary ammonium salt compounds, nigrosin compounds, complexes of aluminum, iron or chrome, and triphenylmethane pigments. In light of controlling ion strength having an effect on toner stability during coagulation and melting and reducing wastewater pollution, it is preferred to use a material that is hard to soluble in water.

Available as the inorganic particulates are all of the conventional toner additives capable of adhering toner particles such as silica, alumina, titania, calcium carbonate, magnesium carbonate, tricalcium phosphate, etc. The inorganic particulates are dispersed with an ionic surface active agent, acidic polymer or basic polymer.

Surface active agents can be used for the purpose of emulsion polymerization, seed polymerization, dispersion of pigment, dispersion of resin particles, dispersion of release agent, coagulation and stabilization of them. Simultaneously usable surface active agents are anionic surface active agents such as sulfuric ester salt surface active agents, sulfonate surface active agents, phosphonate ester surface active agents, soap, etc.; cationic surface active agents such as amine salt surface active agents, quaternary ammonium salt surface active agents, etc.; and non-ionic surface active agents such as polyalcohol, etc.

The toner may be added with additives capable of adhering to toner particles. Preferred examples of additive include, but not limited to, inorganic particles or powder of, for example, $SiO_2$, $TiO_2$, $Al_2O_3$, CuO, ZnO, $SnO_2$, $Fe_2O_3$, MgO, BaO, CaO, $K_2O$, $NaO_2$, $ZrO_2$, $CaO.SiO_2$, $K_2O.(TiO_2)_n$, $Al_2O_3.2SiO_2$, $CaCO_3$, $MgCO_3$, $BaSO_4$, $MgSO_4$, etc. and organic particles or powder of, for example, fatty acids, derivatives of fatty acids, metal acids of them, fluorocarbon resins, polyethylene resins, acryl resins, etc. These particle or powder is preferred to have an average particle size in a range of desirably from 0.01 to 5 $\mu$m, and more desirably from 0.1 to 2 $\mu$m.

Although various methods may be used to manufacture the toner, it is preferred to employ a method comprising the following processes (i) to (Iii):

(i) A process of preparing a dispersion liquid of coagulated resin particles by forming the coagulated resin particles in a dispersion liquid of resin particles;

(ii) A process of forming particulate-adhered coagulated particles by mixing the dispersion liquid of coagulated resin particles with a dispersion liquid of particulates; and (iii) A process of forming toner particles by heating the particulate-adhered coagulated particles to meld.

Solid State Properties of Toner

The toner is preferred to have a volumetric average particle size in a range of desirably from 0.5 to 10 $\mu$m. If the average particle size exceeds the lower limit, there are cases where the toner has an adverse effect on its handling property (supplyability, cleaning efficiency, flowability, etc.) and cases where the toner particles become insufficient in production. On the other hand, if the average particle size exceeds the upper limit, there are cases where the toner has an adverse effect on quality and resolution of images due to graininess and transferability.

It is preferable for the electrophotographic image receiving sheet to use the toner that has a volumetric average grain size distribution index (GSDv) less than 1.3 and a ratio (GSDv)/GSDn) of a volumetric average grain size distribution index (GSDv) relative to a number average grain size distribution index (GSDn) is equal to or greater than 0.9 while meeting the requirement of volumetric average particle size. In addition, it is preferred for the electrophotographic image receiving sheet to use the toner that, while meeting the requirement of volumetric average grain size, has an average of profile factor, that is given by the following expression, between 1.00 and 1.50.

$$\text{Profile factor}=(\pi\times L^2)/(4\times L)$$

where L is the greatest length of toner particle and S is the projected area of toner particle.

When the toner satisfies the requirements as set forth above, the toner has a positive effect on image quality, in particular graininess and resolution of images, and prevents an occurrence of fractional absence of toner transfer and/or blurred toner image, simultaneously with being hardly apt to have an adverse effect on its handling property even if its average particle size is not always small.

It is preferred for the toner itself to have a storage elastic modulus (G') at a temperature of 150° C., that is measured with an angular frequency of 10 rad/sec., in a range of from 10 to 200 Pa in light of improving image quality and preventing an occurrence of offset during the toner image fixing process.

[Method of Image Formation]

The following description will be directed to a method of forming an image on the electrophotographic image receiving sheet 1 using an electrophotographic apparatus equipped with a fixing belt according to embodiments of the present invention. In the following description, the term "fixing belt type electrophotographic apparatus" used hereafter shall mean and refer to the type having at least a heating and pressing section where toner is fused and pressed, a fixing belt operative to convey an electrophotographic image receiving sheet 1 with the toner image receiving layer in contact therewith, and a toner image fixing station where the heated electrophotographic image receiving sheet 1 is cooled while it remains contact with the fixing belt.

In the method of image formation according to a first embodiment, the electrophotographic image receiving sheet 1 with an toner image transferred thereon is heated and pressed by a fixing belt and a roller and then cooled before removal from the fixing belt. In the method of image formation according to a second embodiment, the electrophotographic image receiving sheet 1 with an toner image transferred thereon is heated for toner image fixation by heating and/or pressurizing rollers, subsequently heated and pressed by a fixing belt and a roller and then cooled before removal from the fixing belt. There are known many types of toner image transfer system. Both the methods of image formation may include any type of toner image transfer system well known to those in the art. Preferred examples of toner image transfer process include, but not limited to, a direct toner image transfer process in which a toner image developed on a developing roller is transferred directly to an electrophotographic image receiving sheet and an intermediate belt transfer process in which a toner image is primarily transferred to an intermediate belt and thereafter to an electrophotographic image receiving sheet. In light of environmental stability and high image quality, it is preferred for the electrophotographic image receiving sheet 1 to employ the intermediate belt transfer system. There have been disclosed various fixing belt type electrophotographic apparatuses such as an electrophotographic apparatus equipped with an oilless fixing belt described in, for example, Japanese Unexamined Patent Publication No. 11-352819 and an electrophotographic apparatus that achieves secondary toner image transfer and toner image fixation simultaneously described in, for example, Japanese Unexamined Patent Publication Nos. 5-341666 and 11-352819.

According to the fixing belt type electrophotographic apparatus, toner adhered to the toner image receiving layer of the electrophotographic image receiving sheet 1 is finely fixed due to fusion without diffusing and is cooled and solidified while remaining contact with the fixing belt. As a result, the toner is accepted and completely buried in the toner image receiving layer 2. Thus, the electrophotographic image receiving sheet 1 provides a toner image that is glossy and smooth and has no shoulders.

In the case of using the oilless fixing belt type electrophotographic apparatus whose image forming process is suitable for the electrophotographic image receiving sheet 1 is suitable, it is significant that the electrophotographic image receiving sheet 1 improved in offset. Further, in the case of using other fixing belt type electrophotographic apparatuses, in addition to the improvement of offset property, the electrophotographic image receiving sheet 1 provides full color images improved in image quality and prevented from cracking. As is well known, a color electrophotographic apparatus comprises an image receiving sheet carrying section, a latent image forming section and a developing section disposed close to the latent image forming section, and further an intermediate toner image transfer section located at the center of the apparatus between the image receiving sheet carrying section and the latent image forming section according to types.

There have been known various image forming processes suitable for image quality improvement such as an adhesion transfer process or a heat-assisted transfer process in place of or in combination with an electrostatic transfer process or a bias-roller transfer process. These transfer processes are disclosed in, for example, Japanese Unexamined Patent Publication Nos. 63-113576 and 5-341666. It is particularly preferred to employ a heat assisted transfer process in which an intermediate transfer belt is used especially in the case of using toner whose particle size is small. It is further preferred to equip an intermediate belt after a toner image transfer stage or in a last half of the toner image transfer stage with a cooling device. The cooling device operates to cool the transferred toner to a temperature lower than a melting temperature of a binder resin of the toner or a temperature lower than a temperature 10° C. higher than a glass-transition temperature of the binder resin. This realizes efficient toner image transfer to the electrophotographic image receiving sheet 1 and easily causes the electrophotographic image receiving sheet 1 to separate from the intermediate transfer belt.

Image fixation is the important process that governs gloss and smoothness of a resultant image. There have been known a roller fixing process in which heating and/or pressurizing rollers are used for fixation and a belt fixing process in which a belt is used for fixation. In light of image quality, i.e. glossy and smooth image, the belt fixing process is preferred. Preferred examples of belt fixing process include, but not limited to, a process using an oilless fixing belt such as disclosed, for example, Japanese Unexamined Patent Publication No. 11-352819, and a process in which secondary image transfer and image fixation are achieved simultaneously such as disclosed in, for example, Japanese Unexamined Patent Publication Nos. 5-341666 and 11-352819.

The fixing belt at its surface may be fluoritated and/or siliconized for the purpose of preventing exfoliation and/or offset of toner. It is preferred for the fixing belt to be accompanied by a cooling device for cooling the fixing belt in the last half of a fixing process for easy separation electrophotographic image receiving sheet 1 from the fixing belt. The cooling device is capable of cooling the transferred toner to a temperature lower than a melting temperature of a binder resin of the toner and/or a polymer of the toner image receiving layer 2, or a temperature lower than a temperature 10° C. higher than a glass-transition temperature of the binder resin. On the other hand, at the beginning of fixation, it is necessary for the toner image receiving layer or its toner of the electrophotographic image receiving sheet 1 to be heated sufficiently to its melting temperature. In light of these circumstances, it is preferred to set a cooling temperature in a range of from 30 to 70° C. practically and in a range of from 100 to 180° C. at the beginning of fixation.

One of examples of fixing belt type electrophotographic apparatus will be hereafter described with reference to FIG. 2. After toner 12 has been transferred to the electrophotographic image receiving sheet 1 at a toner image transfer stage, the electrophotographic image receiving sheet 1 with the toner 12 adhered is carried into a fixing position A, in other words, between a heating roller 14 and a pressurizing roller 15. During passing through between these rollers 14 and 15, the toner image receiving layer 2 or the toner 12 of the electrophotographic image receiving sheet 1 is sufficiently heated under a fixing pressure to its melting temperature (fixing temperature). In this instance, the fixing temperature represents a temperature of the external surface of the electrophotographic image receiving sheet 1 measured at a nip between the heating and pressurizing rollers 14 and 15 and is preferred to be in a range of desirably from 80 to 190° C., and more desirably from 100 to 170° C. The fixing pressure represents a pressure measured at the nip between the heating and pressurizing rollers 14 and 15 and is preferred to be in a range of desirably from 1 to 10 $kg/cm^2$, and more desirably from 2 to 7 $kg/cm^2$. The electrophotographic image receiving sheet 1 having been heated and pressurized is carried by a fixing belt 13, such as an endless belt, passing through a cooling device 16. Before arriving at the cooling device 16, the releasing agent dispersedly existing in the toner image receiving layer 2 is sufficiently heated and melts and, as a result, separates out onto the toner image receiving layer 2 to form a film. While the electrophotographic image receiving sheet 1 is passing through the cooling device 16, the electrophotographic image receiving sheet 1 is cooled to a temperature lower than a melting temperature of a binder resin of the toner and/or a polymer of the toner image receiving layer 2, or a temperature lower than a temperature 10° C. higher than a glass-transition temperature of the binder resin, desirably to a temperature in a range of from 20 to 80° C., and more desirably to an ambient temperature of approximately 25° C. As a result of cooling the electrophotographic image receiving sheet 1, the film of release agent formed on the toner image receiving layer 2 is solidified as a release layer.

The electrophotographic image receiving sheet 1 after cooling is further carried to a release position B where a tension roller 17 is disposed. At the release position, the tension roller 17 guides the fixing belt 13 so as to separate it from the electrophotographic image receiving sheet 1. In this instance, it is preferred for the tension roller 17 to have a diameter sufficiently small to enable the electrophotographic image receiving sheet 1 to peel off from the fixing belt 13 with its own stiffness. It is preferred to use an endless fixing belt made of a base material such as polyimide, electroformed nickel or aluminum.

(component B) that contain more than two ≡SiH groups in one molecule and have a ≡SiH group content from one to four times in molar weight as much as the amount of aliphatic unsaturated group in the fluorocarbonsiloxane rubber composition, filler (component C), and a fluorocarbonsiloxane rubber composition having an effective amount of catalyst (component D).

The component A, i.e. fluorocarbon polymer, has fluorocarbon siloxane having a repeating unit that has the following general formula (I) as a major component and an aliphatic unsaturated group.

Formula (I)

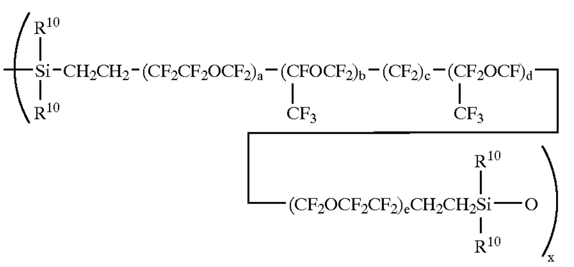

where $R^{10}$ is a substitutable or non-substitutable monovalent hydrocarbon group having a carbon number of 1 to 8, desirably an alkyl group having a carbon number of 1 to 8 or an alkenyl group having a carbon number of 2 or 3, and more desirably a methyl group; a and e take values 0 or 1; b and d are integers from 1 to 4, c is an integer from 0 to 8, and x is an integer greater than 1 and desirably from 10 to 30.

Specific example is a polymer having the following formula (II):

Formula (II)

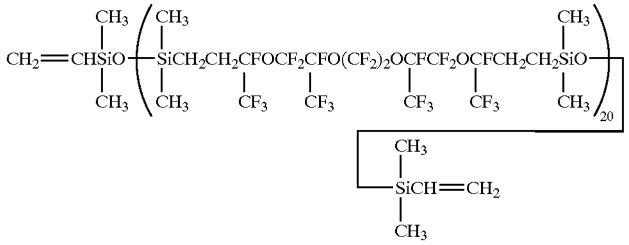

The fixing belt 13 is preferably coated with a thin film of at least more than one materials selected from the group of silicone rubber, fluorocarbon rubber, silicone resin and fluorocarbon resin on the surface. More preferably, it is suitable to form a fluorocarbon silicone rubber film of uniform thickness over the fixing belt 13, or otherwise to form a silicone rubber film of uniform thickness and a fluorocarbons siloxane rubber film over the silicone rubber film.

It is preferred to use fluorocarbons siloxane rubber having a perfluoro alkyl ether group and/or perfluoro alkyl group in a principal chain. Preferred examples of fluorocarbons siloxane rubber is a hardened composition a fluorocarbon polymer (component A) that comprises fluorocarbon siloxane as a major component and having an aliphatic unsaturated group, organopoly siloxane and/or fluorocarbon siloxane The component B, i.e. organopolysiloxane having ≡SiH group, is organohydrogen polysiloxane having at least two hydrogen atoms bonded to silicon atoms in a molecule. In respect to the fluorocarbone siloxane rubber composition, when the component A, i.e. fluorocarbon polymer, has an aliphatic unsaturated group, the organohydrogen polysiloxane can be used as a hardening agent. That is, in this case, a hardened composition is formed through an addition reaction caused between the aliphatic unsaturated group of the fluorocarbone siloxane and the hydrogen atoms bound to the silicon atom of the organohydrogen polysiloxane. Various organohydrogen polysiloxane that are used for addition curing type of silicon rubber composition can be used as the organohydrogen polysiloxane for the composition B.

It is preferred to combine the organohydrogen polysiloxane so as to have ≡SiH groups at least one, desirably one to five, for one aliphatic unsaturated hydrocarbon group of the fluorocarbon siloxan for the component A.

An example of preferred component B, i.e. fluorocarbon having ≡SiH groups, is the unit having the general formula (I) or fluorocarbon siloxane that has a dialkyl hydrogensiloxy group for $R^{10}$ of the general formula (I) and a SiH group such as a dialkyl hydrogensiloxy group or a silyl group as an end group and has the following formula (III):

Formula (III)

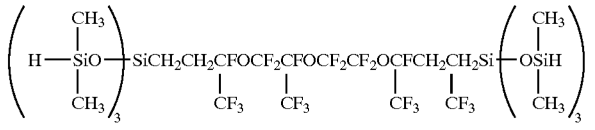

Preferred examples of component C include, but not limited to, various fillers that are conventionally used for general silicon rubber composition, namely stiffening filler such as aerosol silica, sedimentable silica, carbon powder, titanium dioxide, aluminum oxide, quart powder, talc, sericite and bentonite, and fiber filler such as asbestos, glass fiber and organic fiber.

Preferred examples of catalyst for component D include, but not limited to, various catalysts well known for addition reaction such as chloroplatinic acid, alcohol-modified chloroplatinic acid, complex of chloroplatinic acid and olefin, alumina supporting platinum black or palladium, silica supporting platinum black or palladium, carbon supporting platinum black or palladium, complexes of rhodium and olefin, chlorotris (triphenylphosphine) rhodium (Wilkinson catalyst), rhodium (III) acetyl acetonate, which are elements of the VIII family of periodic table, and compounds of them. It is preferred for these complexes to be used as solutions with alcohols solvents, ethers solvents, hydrocarbon solvents.

The fluorocarbonsiloxane rubber used as the component D may be added with various compounding agents within the compass of not vitiating the purpose of the present invention. Examples of compounding agent include, but not limited to, dispersing agents such as diphenylsilanediol, a low polymerization dimethyl polysiloxane with dimethyl polysiloxan at the end of a molecular chain; heat resistance improvers such as ferrous oxide, ferric oxide, cerium oxide, ferric octylate; and coloring agents such as pigment.

The fixing belt is prepared by applying a layer of a fluorocarbonsilixane rubber composition to a belt of heat-resistant resin or metal and curing it with heat. If desirable, the fixing belt may be coated by a general coating method such as spray coating, dip coating or knife coating, using a coating liquid prepare by diluting fluorocarbonsilixane rubber composition with a solvent such as m-xylene hexafluoride or benzotrifluoride. Though the heating for cure is not bound by temperature and time, it is preferred to perform the heating in a temperature range from 100 to 500° C. and in a time range from 5 seconds to 5 hours according to type belt material and belt manufacturing process. Although the fluorocarbonsiloxane rubber composition layer of the fixing belt is not always bound by thickness, it is preferred fort the layer to have a thickness of desirably from 20 to 500 μm and more desirably from 40 to 200 μm.

Figure 2:
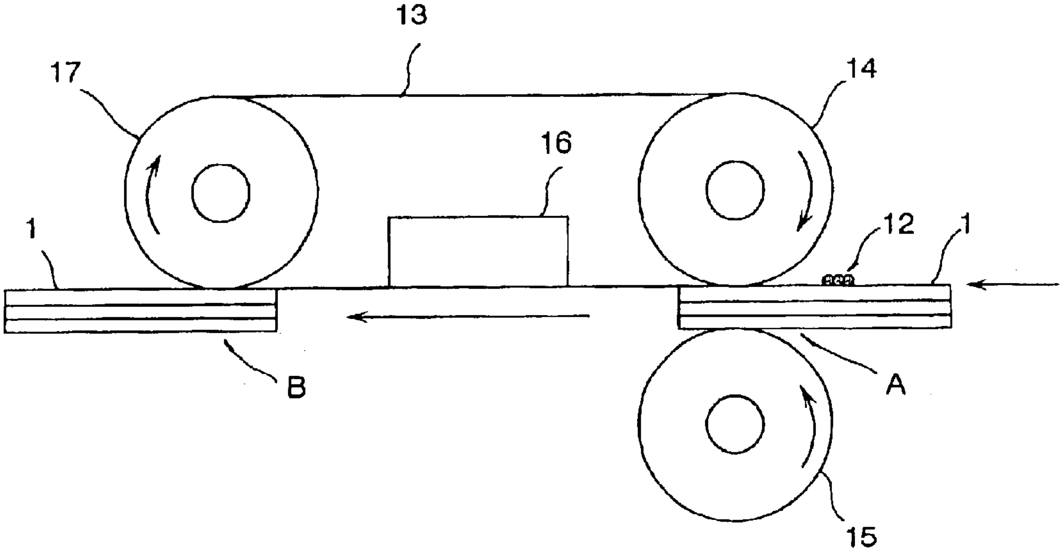
FIG. 2 is a schematic view of a fixing belt type of electrophotographic apparatus for use with the electrophotographic image receiving sheet.

Electrophotographic processes for forming an image on the electrophotographic image receiving sheet 1 is not limited to the process performed by the electrophotographic apparatus shown in FIG. 2 as long as using a fixing belt and include processes for forming full color images by the conventional color electrophotographic apparatuses.

As apparent from the above description, the image forming process of the present invention prevents an occurrence of separation between the electrophotographic image receiving sheet 1 and toner or an occurrence of offset between the electrophotographic image receiving sheet 1 and a toner component, so as to achieve stable sheet carrying. This results in forming a glossy image with photographic quality on the electrophotographic image receiving sheet 1.

EXAMPLES

The following description will be directed to examples of the electrophotographic image receiving sheet 1 by which the present invention is not bounded. In the description, the terms "%" and "part" used herein shall mean "mass %" and "part by mass," respectively.

[Support]

The support 1 was prepared by laminating a 13 μm layer of polyethylene to one of surfaces of a quality paper of a basic weight of 160 g/cm$^2$ on which a toner image receiving layer 2 is formed and a 15 μm layer of polyethylene to another surface of the quality paper. After having treated the polyethylene layers with corona discharge, a mixture of 1000 g of water and 5 g of gelatin was under coated to each of the polymer layer by the use of a wire coater such that a dried layer of the mixture had a weight of 0.1 g/cm$^2$ and then dried. Details of the support are shown in Table 1.

TABLE 1

| | Layer Constitution of Support | | Thickness |
|---|---|---|---|
| Front Under Coating | Gelatin (5 g) & Water (1000 g) | 100 parts | 0.1 μm |
| Front Lamination (Glossy) | High Density Polyethylene (MI: 8 g/10 minutes; Density: 0.950) | 70 parts | 13 μm |
| | Low Density Polyethylene (MI: 7 g/10 minutes; Density: 0.923) | 30 parts | |
| | Anatase Type Titanium Dioxide | 2.0 g/cm$^2$ | |
| Support Base | Quality Paper (Basic pulp weight: 160 g/cm$^2$) | | 151 μm |
| Back Lamination (Matt) | High Density Polyethylene (MI: 8 g/10 minutes; Density: 0.950) | 70 parts | 15 μm |
| | Low Density Polyethylene (MI: 7 g/10 minutes; Density: 0.923) | 30 parts | |
| Back Under Coating | Gelatin (5 g) & Water (1000 g) | 100 parts | 0.1 μm |
| Whole Support | | | 179.2 μm |

[Toner Image Receiving Layer]

Practical and comparative the toner image receiving layer were formed by coating a composition detailed in Table 2 on the support 1 by the use of wire coater such that a dried layer of the composition had a weight of 8 g/cm$^2$ and then dried.

TABLE 2

| | | |
|---|---|---|
| Practical Example 1 (P-Ex 1) | Polyester Resin Water Dispersion (KAZ-1449: Unitika Ltd.) | 100 g |
| | Carnauba Wax (Serzole 524: Chukyo Oils & Fats Co., Ltd.) | 5.0 g |
| | Titanium Dioxide (Taipek ® A-220: Ishiharasangyo Ltd.) | 0.9 g |
| | Water | 40 g |
| Practical Example 2 (P-Ex 2) | Polyester Resin Water Dispersion (KAZ-1449: Unitika Ltd.) | 100 g |
| | Carnauba Wax (Serzole 524 Chukyo Oils & Fats Co., Ltd.) | 4.0 g |
| | Titanium Dioxide (Taipek ® A-220: Ishiharasangyo Ltd.) | 0.9 g |
| | Water | 40 g |
| Practical Example 3 (P-Ex 3) | Polyester Resin Water Dispersion (KAZ-1449: Unitika Ltd.) | 100 g |
| | Carnauba wax (Serzole 524: Chukyo Oils & Fats Co., Ltd.) | 3.0 g |
| | Titanium Dioxide (Taipek ® A-220: Ishiharasangyo Ltd.) | 0.9 g |
| | Water | 40 g |
| Practical Example 4 (P-Ex 4) | Polyester Resin Water Dispersion (KAZ-1449: Unitika Ltd.) | 100 g |
| | Carnauba Wax (Serzole 524: Chukyo Oils & Fats Co., Ltd.) | 2.0 g |
| | Titanium Dioxide (Taipek ® A-220: Ishiharasangyo Ltd.) | 0.9 g |
| | Water | 40 g |
| Practical Example 5 (P-Ex 5) | Polyester Resin Water Dispersion (KAZ-1449: Unitika Ltd.) | 100 g |
| | Carnauba Wax (Serzole 524: Chukyo Oils & Fats Co., Ltd.) | 1.0 g |
| | Titanium Dioxide (Taipek ® A-220: Ishiharasangyo Ltd.) | 0.9 g |
| | Water | 40 g |
| Comparative Example 1 (C-Ex 1) | Polyester Resin (TaftonU-5: Kao Co., Ltd.) | 400 g |
| | Titanium Dioxide (Taipek ® A-220: Ishiharasangyo Ltd.) | 60.0 g |
| | Triphenylphosphate (Daihachi Chemicals Co., Ltd.) | 34.8 g |
| | Methyl ethyl Ketone | 800 g |
| Comparative Example 2 (C-Ex 2) | Polyester Resin (Toyobo Co., Ltd) | 400 g |
| | Titanium Dioxide (Taipek ® A-220: Ishiharasangyo Ltd.) | 60 g |
| | Triphenylphosphate (Daihachi Chemicals Co., Ltd.) | 34.8 g |
| | Methyl ethyl Ketone | 800 g |
| Comparative Example 3 (C-Ex 3) | Polyester Resin (KZA-1449: Unitika Ltd.) | 170 g |
| | Silicone Oil (KF96: Shinetsu Chemical Industry Co., Ltd) | 30 g |
| | Methyl ethyl Ketone | 800 g |
| Comparative Example 4 (C-Ex 4) | Polyester Resin (KZA-1449: Unitika Ltd.) | 170 g |
| | Silicone Oil (KF96: Shinetsu Chemical Industry Co., Ltd) | 7 g |
| | Methyl ethyl Ketone | 800 g |

[Assessment of Solid State Properties of Electrophotographic Image Receiving Sheet]

In order to establish a qualitative evaluation of the electrophotographic image receiving sheet 1, surface free energy of the toner image receiving layers of the respective practical and comparative electrophotographic image receiving sheets P-Ex1–P-Ex5 and C-Ex1–C-Ex4 as listed in Table 1 were obtained.

As was described earlier, polar components of surface free energy of the toner image receiving layer before and after having heated the electrophotographic image receiving sheet $\gamma sp^0$[mJ/m$^2$] and $\gamma sp^1$[mJ/m$^2$] were derived on the basis of Fowks' formula described earlier. The polar component of surface free energy $\gamma sp^0$ was measured for each of the practical and comparative electrophotographic image receiving sheets P-Ex1–P-Ex5 and C-Ex1–C-Ex4 before heating. The polar component of surface free energy $\gamma sp^1$ was measured for each of the practical and comparative electrophotographic image receiving sheets P-Ex1–P-Ex5 and C-Ex1–C-Ex4 that has been heated to a surface temperature of 120° C. by the use of a hot plate and was cooled to 25° C. after a lapse of ten minutes from the point of time at which the electrophotographic image receiving sheet attains that surface temperature. The polar component $\gamma sp^1$ of surface free energy was calculated by substituting contact angles of the toner image receiving layer in the Fowks' formula. In this instance, values of the polar force of surface tension peculiar to each probe liquid that were set force in Journal of Society of Fiber Science & Technology, Japan, 38(4), T-147, 1982 were used. The results are set forth together with differences between these polar surface free energy in Table 3.

The contact angles of toner image receiving layer θ with respect to a probe liquid consisting of water or methylene iodide before and after having heated the electrophotographic image receiving sheet were measured for each of the practical and comparative electrophotographic image receiving sheets P-Ex1–P-Ex5 and C-Ex1–C-Ex4 by the use of Contact Angle Gauge CA-A manufactured by Kyowa Surface Chemistry Co., Ltd.

Specifically, the contact angle before heating $\theta^0$ was measured in an ambient atmosphere of a surface temperature of 25° C. and a relative humidity of 55%. The contact angle after heating $\theta^1$ was measured in an ambient atmosphere of a surface temperature of 25° C. and a relative humidity of 55% after the electrophotographic image receiving sheet had been heated to a surface temperature of 120° C. by the use of a hot plate and cooled to 25° C. after a lapse of ten minutes from the point of time at which the electrophotographic image receiving sheet attained a surface temperature of 25° C. The results are set forth together with differences between these contact angles in Table 4.

TABLE 3

| | $\gamma sp^0$ [mJ/m$^2$] | $\Gamma sp^1$ [mJ/m$^2$] | $\gamma sp^0$–$\gamma sp^1$ [mJ/m$^2$] |
|---|---|---|---|
| P-Ex 1 | 7.5 | 0.2 | 7.3 |
| P-Ex 2 | 5.7 | 0.7 | 5.0 |
| P-Ex 3 | 5.2 | 0.2 | 5.0 |
| P-Ex 4 | 5.3 | 0.6 | 4.7 |
| P-Ex 5 | 5.3 | 2.2 | 3.1 |
| C-Ex 1 | 1.7 | 2.0 | −0.3 |
| C-Ex 2 | 19.6 | 23.3 | −3.7 |
| C-Ex 3 | 6.4 | 4.7 | 1.7 |
| C-Ex 4 | 5.7 | 5.3 | 0.4 |

TABLE 4

| | $\theta^0$ [°] | $\theta^1$ [°] | $\theta^0$—$0^0$ [°] |
|---|---|---|---|
| P-Ex 1 | 75.8 | 97.6 | 21.8 |
| P-Ex 2 | 77.6 | 96.2 | 18.6 |
| P-Ex 3 | 78.8 | 97.8 | 19 |
| P-Ex 4 | 78.8 | 93.8 | 15 |
| P-Ex 5 | 78.4 | 86.8 | 8.2 |
| C-Ex 1 | 83.4 | 84.4 | 1.0 |
| C-Ex 2 | 56.4 | 53.4 | −3.0 |
| C-Ex 3 | 85 | 89.4 | 4.4 |
| C-Ex 4 | 86.4 | 87.7 | 1.3 |

[Assessment of Electrophotographic Image]

In order to evaluate glossiness, offset resistance and transportability of the electrophotographic image receiving sheet after image formation by the use of the fixing belt type electrophotographic apparatus shown in FIG. 2. Used as original pictures for reproduction were a solid-white picture, a gray picture (R, G and B component of an image were 50%), a solid-black picture and a female portrait. The fixing belt type electrophotographic apparatus used to reproduce the original pictures was a DocuColor 1250-FP color laser printer manufactured by Fuji Zerox Co., Ltd. with a fixing device having either one of the following fixing belts 1–3.

(A). Fixing belt 1: A fluorocarbon-coated endless belt comprising a polyimide base film and a 35 μm thickness of perfluoroalkoxyalkane layer coated on the polyimide base film:

(B). Fixing belt 2: A silicone-coated endless belt comprising a polyimide base film and a 35 μm thickness of silicon-modified acrylic polymer layer coated on the polyimide base film:

(C). Fixing belt 3: A belt comprising a polyimide base film, a 40 μm thickness of silicon rubber layer coated on the polyimide base film, and a 20 μm thickness of fluorocarbon siloxane rubber layer coated over the silicon rubber. The silicon rubber layer was formed by applying a layer of a primer for silicon, DY39-115 manufactured by Toray Dow Corning Silicone Co., Ltd., drying the primer layer in the wind for 30 minutes, dip-coating a mixture layer of 100 parts of DY35-796AB that was one of silicon rubber precursors manufactured by Toray Dow Corning Silicone Co., Ltd. and 30 parts of n-hexane and performing primary vulcanization of the mixture layer at 120° C. for 10 minutes. The fluorocarbon siloxane rubber layer was formed by dip-coating a layer of 100 parts of SIFEL 610 that was one of fluorocarbon siloxane rubber precursors manufactured by Shinetsu Chemical Industry Co., Ltd. and 20 parts of fluorine solvent that was a mixed solvent of m-xylene hexafluoride, parphloroalkane and parphloro (2-butyl tetrahydrofuran), performing primary vulcanization of the layer at 120° C. for 10 minutes and subsequently a secondary vulcanization of the layer at 180° C. for four hours.

The fixing belt 13, namely the fixing belt 1, 2 or 3, provided a carrying speed of 30 mm/second and nip pressure of 0.2 Mpa (2 kgf/cm$^2$) with respect to the heating roller 14 and the pressurizing roller 15. The heating roller 14 and the pressurizing roller 15 were set to a heating temperature of 155° C. at which fixation was performed and a temperature of 130° C., respectively. In this instance, the electrophotographic image receiving sheet had been cooled to a temperature of 60° C. when it was separated from the fixing belt 13.

Glossiness

Measurements of glossiness were made by the use of a digital declination light meter, UGV-5D manufactured by Suga Test Machine Co., Ltd., for the practical and comparative electrophotographic image receiving sheets P-Ex1–P-Ex5 and C-Ex1–C-Ex4 to which a toner image was transferred at a fixing temperature of 155° C. Specifically, 45° glossiness was measured in conformity with JIS Z 8751. The larger the value of 45° glossiness, the glosser the reproduced picture.

Offset Resistance

Assessments offset resistance were made by macroscopic examination of surface texture and glossiness of toner images transferred to the practical and comparative electrophotographic image receiving sheets P-Ex1–P-Ex5 and C-Ex1–C-Ex4 at a fixing temperature of 150° C. Assessments of separation resistance were also made by macroscopic examination as to whether toner images transferred to or toner layers of the practical and comparative electrophotographic image receiving sheets P-Ex1–P-Ex5 and C-Ex1–C-Ex4 were fractionally separated.

Transportability

In addition, assessment of transportability were made by counting the total number of electrophotographic image receiving sheets that had raised an feeding error, jamming or stacking error when 100 electrophotographic image receiving sheets were continuously fed to the fixing belt type electrophotographic apparatus shown in FIG. 2. A practically acceptable level is less than two.

The results are set forth in Tables 5, 6 and 7 for the fixing belts 1, 2 and 3, respectively. In Tables 5–6, a symbol ○ indicates that the electrophotographic image receiving sheet is accompanied by surface defects such as reverse transfer of toner particles, surface irregularities and/or separation of a toner image or a toner layer, and the symbol X indicates that the electrophotographic image receiving sheet is accompanied by such surface defects.

TABLE 5

| | Glossiness | Offset/Separation Resistance | Transportability |
|---|---|---|---|
| P-Ex 1 | 88.0 | ○ | 0 |
| P-Ex 2 | 77.8 | ○ | 0 |
| P-Ex 3 | 79.4 | ○ | 0 |
| P-E 4 | 78.6 | ○ | 0 |
| P-Ex 5 | 76.8 | ○ | 1 |
| C-Ex 1 | 39.5 | X | 5 |
| C-Ex 2 | 41.2 | X | 3 |
| C-Ex 3 | 53.7 | X (Slip) | 3 |
| C-Ex 4 | 51.7 | X (Slip) | 6 |

TABLE 6

| | Glossiness | Offset/Separation Resistance | Transportability |
|---|---|---|---|
| P-Ex 1 | 79.0 | ○ | 0 |
| P-Ex 2 | 78.8 | ○ | 0 |
| P-Ex 3 | 78.4 | ○ | 0 |
| P-E 4 | 79.6 | ○ | 1 |
| P-Ex 5 | 77.8 | ○ | 2 |
| C-Ex 1 | 38.5 | X | 7 |
| C-Ex 2 | 40.6 | X | 6 |
| C-Ex 3 | 51.7 | X (Slip) | 5 |
| C-Ex 4 | 0.8 | X (Slip) | 8 |

TABLE 7

| | Glossiness | Offset/Separation Resistance | Transportability |
|---|---|---|---|
| P-Ex 1 | 81.0 | ○ | 0 |
| P-Ex 2 | 79.8 | ○ | 0 |
| P-Ex 3 | 80.4 | ○ | 0 |
| P-E 4 | 80.6 | ○ | 0 |
| P-Ex 5 | 78.8 | ○ | 1 |
| C-Ex 1 | 40.5 | X | 6 |
| C-Ex 2 | 42.7 | X | 5 |
| C-Ex 3 | 55.7 | X (Slip) | 3 |
| C-Ex 4 | 52.7 | X (Slip) | 7 |

All of the practical and comparative electrophotographic image receiving sheets P-Ex1–P-Ex5 and C-Ex1–C-Ex4 well passed through commercially available color laser printers, such as full color laser printers DC-2220, DCC-400CP, DCC-320PC and DCC-500C manufacture by Fuji Xerox Co., Ltd., with the same results.

While the invention has been described in detail in conjunction with specific embodiments thereof, it will be apparent to those skilled in the art that various other embodiments and variants can be made without departing from the spirit and scope of the invention.

What is claimed is:

1. An electrophotographic image receiving sheet for use in an electrophotography in which a fixing belt is used to fix a toner image, said electrophotographic image receiving sheet comprising:

a support sheet;

a toner image receiving layer formed on said support sheet for accepting toner, said toner image receiving layer containing a release agent and satisfying the following condition:

$$\gamma sp^0-\gamma sp^1 \geqq 2.5[\mathrm{mJ/m^2}]$$

where $\gamma sp^0$ is the value of a polar component of surface free energy of said toner image receiving layer before heating the photoelectric image receiving sheet in the unit of $mJ/m^2$; and $\gamma sp^1$ is the value of a polar component of surface free energy of said toner image receiving layer after having heated the photoelectric image receiving sheet to 120° C. and then cooled it to 25° C. in the unit of $mJ/m^2$.

2. An electrophotographic image receiving sheet as defined in claim 1, wherein said toner image receiving layer further satisfies the following condition:

$$\theta^1-\theta^0 \geqq 5[°]$$

where $\theta^1$ is the contact angle of water on a surface of said toner image receiving layer in the unit of ° (degree); and $\theta^1$ is the contact angle of water on the surface of said toner image receiving layer in the unit of ° (degree) when the electrophotographic image receiving sheet has been heated to 120° C. and subsequently cooled to 25° C.

3. An electrophotographic image receiving sheet as defined in claim 1, wherein said release agent comprises at least one selected group of silicone compound, fluorocarbon compound, wax and a matt agent.

4. An electrophotographic image receiving sheet as defined in claim 3, wherein said wax comprises either one of natural vegetable wax and natural mineral wax.

5. An electrophotographic image receiving sheet as defined in claim 4, wherein said natural vegetable wax is carnauba wax having a melting temperature in a range of from 70 to 95° C.

6. An electrophotographic image receiving sheet as defined in claim 4, wherein said natural mineral wax is montan wax having a melting temperature in a range of from 70 to 95° C.

7. An electrophotographic image receiving sheet as defined in claim 1, wherein said toner image receiving layer contains a thermoplastic resin that, is of a type of self-dispersed aqueous polyester resin emulsion having the following properties (1)–(4):

(8) a number-average molecular weight in a range of from 5000 to 10000;

(9) a molecular weight distribution (a ratio of a weight-average molecular weight relative to a number-average molecular weight) equal to or less than 4;

(10) a glass-transition temperature in a range of from 40 to 100° C.; and

(11) a volumetric average particle diameter in a range of from 20 to 200 nmø.

8. An electrophotographic image receiving sheet as defined in claim 4, wherein said support comprises one of base paper, synthetic paper, a synthetic resin sheet, coated paper and laminated paper.

9. An electrophotographic image receiving sheet as defined in claim 1, wherein said toner contains at least a binding resin and a coloring agent and has a volumetric average particle size in a range of from 0.5 to 10 μm and a volumetric average grain size distribution index being less than 1.3.

10. An electrophotographic image receiving sheet as defined in claim 9, wherein said toner has a ratio of said volumetric average grain size distribution index relative to a number average grain size distribution index equal to or greater than 0.9.

11. An electrophotographic image receiving sheet as defined in claim 9, wherein said toner is manufactured by a method including at least a process of preparing a dispersion liquid of coagulated resin particles by forming said coagulated resin particles in a dispersion liquid of resin particles, a process of forming particulate-adhered coagulated particles by mixing said dispersion liquid of coagulated resin particles with a dispersion liquid of particulates, and a process of forming toner particles by heating and melting said particulate-adhered coagulated particles.

12. An electrophotographic image receiving sheet as defined in claim 1, wherein said toner contains at least a binding resin and a coloring agent and has a volumetric average particle size in a range of from 0.5 to 10 μm and an average of profile factors in a range of from 1.00 and 1.50, said profile factor being defined by the following expression $$(\pi\times L^2)/(4\times L)$$

where L and S are the greatest length and the projected area of toner particle, respectively.

13. An electrophotographic image receiving sheet as defined in claim 12, wherein said toner is manufactured by a method including at least a process of preparing a dispersion liquid of coagulated resin particles by forming said coagulated resin particles in a dispersion liquid of resin particles, a process of forming particulate-adhered coagulated particles by mixing said dispersion liquid of coagulated resin particles with a dispersion liquid of particulates, and a process of forming toner particles by heating and melting said particulate-adhered coagulated particles.

14. An electrophotographic image forming method of forming an image developed with toner on an electrophotographic image receiving sheet comprising a support sheet and a toner image receiving layer formed on said support sheet for accepting toner, said electrophotographic image forming method comprising the steps of:

heating and pressurizing a surface of said electrophotographic image receiving sheet with a toner image formed thereon with said fixing belt and a roller;

cooling said electrophotographic image receiving sheet; and peeling off said electrophotographic image receiving sheet from said fixing belt;

wherein said toner image receiving layer contains a release agent and satisfies the following condition:

$$\gamma sp^0-\gamma sp^1 \geqq 2.5[\mathrm{mJ/m^2}]$$

where $\gamma sp^0$ is the value of a polar component of surface free energy of said toner image receiving layer before heating the photoelectric image receiving sheet in the unit of $mJ/m^2$; and $\gamma sp^1$ is the value of a polar component of surface free energy of said toner image receiving layer after having heated the electrophotographic image receiving sheet to 120° C. and then cooled it to 25° C. in the unit of $mJ/m^2$.

15. An electrophotographic image forming method as defined in claim 14, and further comprising the step of fixing said toner image formed on said electrophotographic image receiving sheet with a heating roller.

16. An electrophotographic image forming method as defined in claim 14, wherein said said electrophotographic image receiving sheet is cooled to a temperature lower than a either one of a melting temperature of a binder resin contained in said toner and a temperature lower than a temperature 10° C. higher than a glass-transition temperature of said binder resin that is lower than the other.

17. An electrophotographic image forming method as defined in claim 14, wherein said fixing belt has a uniform thickness layer of fluorocarbons siloxane rubber formed thereon.

18. An electrophotographic image forming method as defined in claim 17, wherein said fluorocarbons siloxane rubber has a perfluoroalkyl ether group and/or perfluoroalkyl group in a principal chain.

19. An electrophotographic image forming method as defined in claim 14, wherein said fixing belt has a uniform thickness layer of silicone rubber formed thereon and a uniform thickness layer of fluorocarbons siloxane rubber formed over said uniform thickness layer of silicone rubber.

20. An electrophotographic image forming method as defined in claim 19, wherein said fluorocarbons siloxane rubber has a perfluoroalkyl ether group and/or perfluoroalkyl group in a principal chain.

21. An electrophotographic image forming method as defined in claim 14, wherein said toner image receiving layer further satisfies the following condition:

$$\theta^1-\theta^0 \geqq 5[°]$$

where $\theta^1$ is the contact angle of water on a surface of said toner image receiving layer in the unit of ° (degree); and $\theta^1$ is the contact angle of water on the surface of said toner image receiving layer in the unit of ° (degree) when the electrophotographic image receiving sheet has been heated to 120° C. and subsequently cooled to 25° C.

22. An electrophotographic image forming method as defined in claim 14, wherein said release agent comprises at least one selected group of silicone compound, fluorocarbon compound, wax and a matt agent.

23. An electrophotographic image forming method as defined in claim 22, wherein said wax comprises either one of natural vegetable wax and natural mineral wax.

24. An electrophotographic image forming method as defined in claim 23, wherein said natural vegetable wax is carnauba wax having a melting temperature in a range of from 70 to 95° C.

25. An electrophotographic image forming method as defined in claim 23, wherein said natural mineral wax is montan wax having a melting temperature in a range of from 70 to 95° C.

26. An electrophotographic image forming method as defined in claim 14, wherein said toner image receiving layer contains a thermoplastic resin that is of a type of self-dispersed aqueous polyester resin emulsion having the following properties (1)–(4):

(1) a number-average molecular weight in a range of from 5000 to 10000;

(2) a molecular weight distribution (a ratio of a weight-average molecular weight relative to a number-average molecular weight) equal to or less than 4;

(3) a glass-transition temperature in a range of from 40 to 100° C.; and (4) a volumetric average particle diameter in a range of from 20 to 200 nmφ.

27. An electrophotographic image forming method as defined in claim 23, wherein said support comprises one of base paper, synthetic paper, a synthetic resin sheet, coated paper and laminated paper.

28. An electrophotographic image forming method as defined in claim 14, wherein said toner contains at least a binding resin and a coloring agent and has a volumetric average particle size in a range of from 0.5 to 10 μm and a volumetric average grain size distribution index being less than 1.3.

29. An electrophotographic image forming method as defined in claim 28, wherein said toner has a ratio of said volumetric average grain size distribution index relative to a number average grain size distribution index equal to or greater than 0.9.

30. An electrophotographic image forming method as defined in claim 28, wherein said toner is manufactured by a method including at least a process of preparing a dispersion liquid of coagulated resin particles by forming said coagulated resin particles in a dispersion liquid of resin particles, a process of forming particulate-adhered coagulated particles by mixing said dispersion liquid of coagulated resin particles with a dispersion liquid of particulates, and a process of forming toner particles by heating and melting said particulate-adhered coagulated particles.

31. An electrophotographic image forming method as defined in claim 14, wherein said toner contains at least a binding resin and a coloring agent and has a volumetric average particle size in a range of from 0.5 to 10 μm and an average of profile factors in a range of from 1.00 and 1.50, said profile factor being defined by the following expression $$(\pi \times L^2)/(4 \times L)$$

where L and S are the greatest length and the projected area of toner particle, respectively.

32. An electrophotographic image forming method as defined in claim 31, wherein said toner is manufactured by a method including at least a process of preparing a dispersion liquid of coagulated resin particles by forming said coagulated resin particles in a dispersion liquid of resin particles, a process of forming particulate-adhered coagulated particles by mixing said dispersion liquid of coagulated resin particles with a dispersion liquid of particulates, and a process of forming toner particles by heating and melting said particulate-adhered coagulated particles.

* * * * *